US009467666B1

(12) United States Patent
Topliss et al.

(10) Patent No.: US 9,467,666 B1
(45) Date of Patent: Oct. 11, 2016

(54) MINIATURE CAMERA SUPER RESOLUTION FOR PLURAL IMAGE SENSOR ARRANGEMENTS

(71) Applicant: Apple Inc., Cupertino, CA (US)

(72) Inventors: Richard J. Topliss, Campbell, CA (US); Richard H. Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/798,183

(22) Filed: Jul. 13, 2015

Related U.S. Application Data

(60) Provisional application No. 62/057,108, filed on Sep. 29, 2014.

(51) Int. Cl.
| | |
|---|---|
| G02B 13/16 | (2006.01) |
| H04N 5/225 | (2006.01) |
| H04N 9/097 | (2006.01) |
| G06F 3/041 | (2006.01) |
| H04N 5/232 | (2006.01) |
| H04N 5/3745 | (2011.01) |
| H04N 5/343 | (2011.01) |
| G06T 3/40 | (2006.01) |
| G06T 7/00 | (2006.01) |
| G06T 7/40 | (2006.01) |

(52) U.S. Cl.
CPC .......... *H04N 9/097* (2013.01); *G06F 3/0412* (2013.01); *G06T 3/4015* (2013.01); *G06T 7/0085* (2013.01); *G06T 7/408* (2013.01); *H04N 5/23296* (2013.01); *H04N 5/343* (2013.01); *H04N 5/37457* (2013.01); *G06F 2203/04101* (2013.01); *G06T 2207/10004* (2013.01); *G06T 2207/10016* (2013.01); *G06T 2207/10024* (2013.01); *G06T 2207/10152* (2013.01); *G06T 2207/20192* (2013.01)

(58) Field of Classification Search
USPC ................ 348/335, 340, 345, 348, 350, 352
See application file for complete search history.

(56) References Cited

U.S. PATENT DOCUMENTS 7,639,297 B2 * 12/2009 Yoneda ............. H01L 27/14603
348/304
8,294,780 B2   10/2012 Chang
(Continued)

FOREIGN PATENT DOCUMENTS

EP    2431782    3/2012
EP    2523450    5/2014

*Primary Examiner* — Yogesh Aggarwal
(74) *Attorney, Agent, or Firm* — Robert C. Kowert; Meyertons, Hood, Kivlin, Kowert & Goetzel, P.C.

(57) ABSTRACT

In some embodiments, a method includes receiving at a plurality of digital image sensor arrays a plurality of respective portions of visible incoming light arriving at a camera module. In some embodiments, the method further includes calculating positions of a plurality of corresponding apparent features in each of the respective portions of visible light. In some embodiments, the method further includes identifying misalignments of the plurality of digital image sensor arrays based on comparison of respective positions of ones of the corresponding apparent features in each of the respective portions of visible light. In some embodiments, the method further includes calculating respective contributions of the respective portions to the combined image data structure based at least in part on the misalignments. In some embodiments, the method further includes generating a combined image data structure from the plurality of respective portions.

20 Claims, 30 Drawing Sheets

(56) References Cited

U.S. PATENT DOCUMENTS

| | | |
|---|---|---|
| 8,542,287 B2 | 9/2013 | Griffith et al. |
| 8,670,069 B2 * | 3/2014 | Sjoberg ............... H04N 5/2253 348/345 |
| 8,730,299 B1 | 5/2014 | Kozko |
| 2007/0002159 A1 * | 1/2007 | Olsen ...................... G02B 7/04 348/335 |
| 2009/0168630 A1 * | 7/2009 | Kim ..................... G11B 7/0065 369/103 |
| 2009/0251676 A1 * | 10/2009 | Komori ............... G03F 7/70291 355/71 |
| 2010/0166261 A1 * | 7/2010 | Tsuji .................. G06K 9/00228 382/103 |
| 2012/0038747 A1 | 2/2012 | Kim et al. |
| 2014/0293117 A1 * | 10/2014 | Murakami ........... G02B 21/365 348/349 |

* cited by examiner

RGB Result of De-mosaic Algorithm
on Bayer Sampled Image

Bayer Sampling of a Black and White
'Slanted Edge' Target

Ideal RGB Sampling of a Black and
White 'Slanted Edge' Target

Unfiltered combined RGB image RGBunfil size 6mx2n 2210 = ( RGBve 2220 X CRGBve 2280 ) +

( RGBhe 2220 X CRGBhe 2230 ) +

( RGBvs 2260 X CRGBvs 2250 ) +

Multiplication is Pixel, not Matrix Multiplication ( RGBhs 2280 X CRGBhs 2270 )

*FIG. 22*

| P1 | P2 | P3 | P4 | P5 | — 2430 |
|---|---|---|---|---|---|
| 0 | 0 | 170 | 255 | 255 | — 2440 |
| 0 | 0.5 | -0.17 | -0.5 | 0 | — 2450 |

Edge Position

| P1 | P2 | P3 | P4 | P5 | — 2630 |
| 0 | 0 | 255 | 170 | 170 | — 2640 |

# MINIATURE CAMERA SUPER RESOLUTION FOR PLURAL IMAGE SENSOR ARRANGEMENTS

This application claims benefit of priority to U.S. Provisional Application No. 62/057,108, filed Sep. 29, 2014, which is hereby incorporated by reference in its entirety.

BACKGROUND

1. Technical Field

This disclosure relates generally to cameras, and, more specifically, to light sensor operation in cameras.

2. Description of the Related Art

Miniature cameras are typically used in mobile devices such as cellphones and other multifunction devices. There is a constant demand to improve the quality and performance of miniature cameras in mobile devices. In such devices, space is a premium and every effort is made to minimize the camera size.

One camera feature in particular that is highly desirable optical zoom, to allow the user to frame and photograph high quality images of objects further from the camera. A zoom lens is a lens where the lens elements can be moved relative to one another to change the focal length of the lens. In doing so, this changes the field of view of the lens. Such lenses are typically much bigger than the space currently available for miniature cameras in mobile devices.

For conventional image sensors, a series of color filters are applied over the light sensitive pixels (for example in a Bayer pattern), and hence the majority of light is absorbed by the color filters and lost.

SUMMARY OF EMBODIMENTS

Some embodiments include a method for resampling image data from a plurality of image sensor arrays in a miniature camera. In some embodiments, the method includes receiving at a plurality of digital image sensor arrays a plurality of respective portions of visible incoming light arriving at a camera module. In some embodiments, each respective portion of the plurality of respective portions includes light of a wavelength range different from a wavelength range of another respective portion. In some embodiments, the method further includes calculating positions of a plurality of corresponding apparent features in each of the respective portions of visible light. In some embodiments, the method further includes identifying misalignments of the plurality of digital image sensor arrays based on comparison of respective positions of ones of the corresponding apparent features in each of the respective portions of visible light. In some embodiments, the method further includes calculating respective contributions of the respective portions to the combined image data structure based at least in part on the misalignments. In some embodiments, the method further includes generating a combined image data structure from the plurality of respective portions, based at least in part on the respective contributions of the respective portions to the combined image data structure.

BRIEF DESCRIPTION OF THE DRAWINGS

FIG. 22 illustrates computations related to an RGB image with combined information from vertical edges, horizontal edges, vertical stripes and horizontal stripes for use in a camera for use in a portable multifunction device in accordance with some embodiments.

Figure 1:
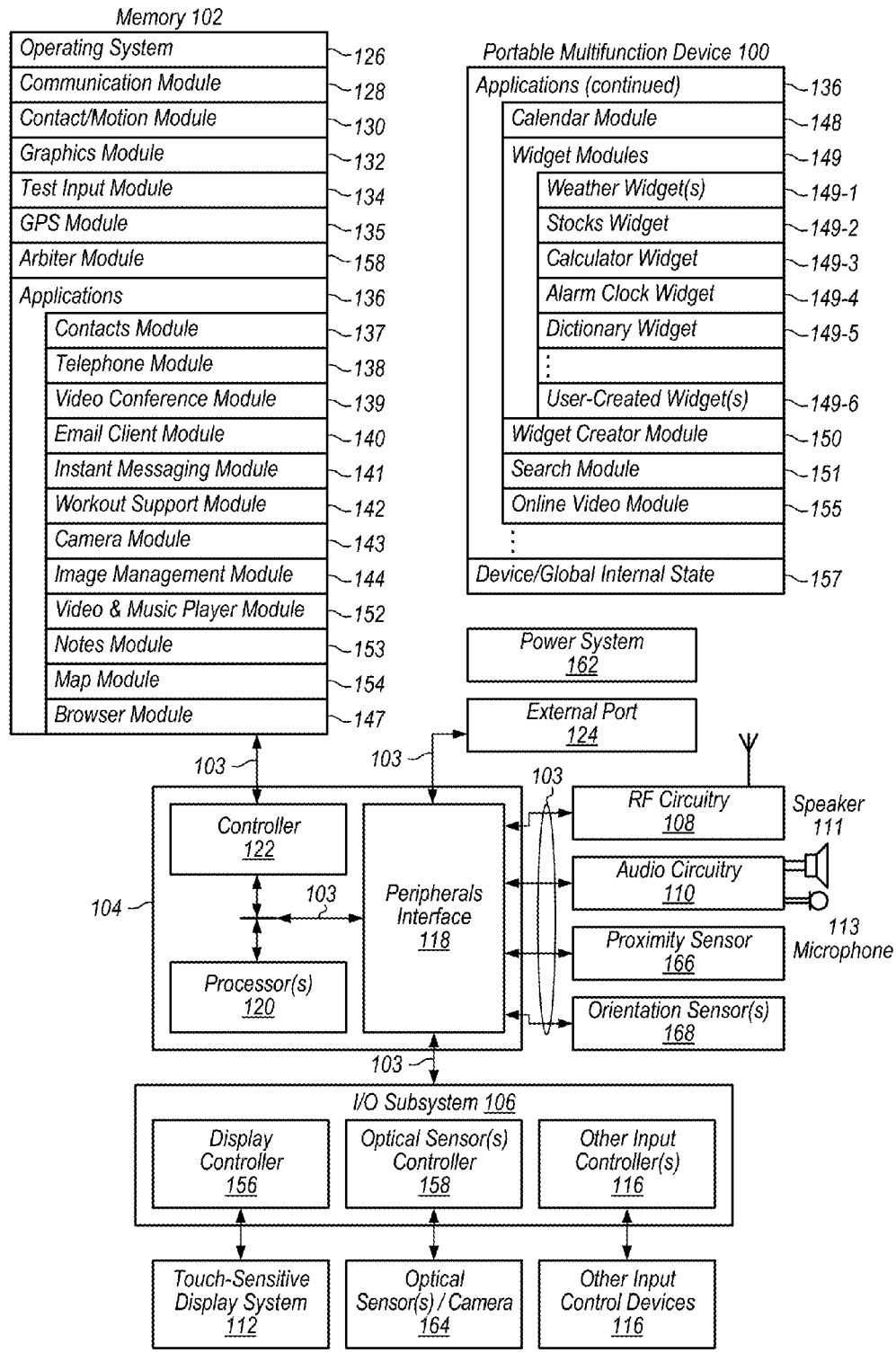
FIG. 1 illustrates a block diagram of a portable multifunction device in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments include a high quality zoom camera that fits in a competitive size. Some embodiments reduce the size of the zoom lens by reducing the size of the image sensor illuminated by the lens. The optical quality is maintained by using three such smaller image sensors or sensor arrays, where the size of the light sensitive arrays of the three image sensors in aggregate is comparable to solutions with a single larger image sensor.

Some embodiments include a super-resolution resampling algorithm for use in miniature cameras that combines the information from three digital image sensor arrays, each substantially receiving different portions of the incoming visible light based on wavelength (i.e. receiving different colors). In some embodiments, the method makes use of the natural small misalignments in the relative positions of the arrays that image the scene (appropriately measured and calibrated) in order to sample the scene at a higher spatial resolution than the native spatial resolution of each sensor array.

In some embodiments, separately for each array, the sampled data is assessed for the position of supposed edges, and height of supposed stripes, within each pixel, both horizontal edges and stripes and vertical edges and stripes. In some embodiments, the strength of each of these supposed horizontal and vertical edges and stripes at each sup-sampled site in all three channels is used to assess the contribution from each estimate to use in the final image. In some embodiments, the generated super-sampled image is filtered to extract the grayscale information, and the differential color information at each pixel. In some embodiments, the differential color information is filtered using an averaging filter with the aim of reducing color artifacts. In some embodiments, a further calculation looks and the spread in color information in the neighborhood of a given pixel, as compared to the grayscale information (channel average) to enable a further calculation that decides the proportion of the final image that should be based on the image without filtering to the chromatic information, and what proportion should be based on the image with an averaging filter applied to the chromatic information.

In some embodiments, a camera of a multifunction device includes a first image sensor attached to a first ceramic substrate, a second image sensor attached to a second ceramic substrate, a lens system, and a color-splitting component along an optical path between the lens system and the image sensors. The color-splitting component separates the light into a plurality of respective portions of visible incoming light arriving at a camera module. The camera of the multifunction device also includes a processor and a memory containing program instructions.

In some embodiments the instructions are computer-executable to cause the processor to perform receiving at a plurality of digital image sensor arrays a plurality of respective portions of visible incoming light arriving at a camera module. In some embodiments, each respective portion of the plurality of respective portions includes light of a wavelength range different from a wavelength range of another respective portion. In some embodiments the instructions are computer-executable to cause the processor to perform calculating positions of a plurality of corresponding apparent features in each of the respective portions of visible light.

In some embodiments the instructions are computer-executable to cause the processor to perform identifying misalignments of the plurality of digital image sensor arrays based on comparison of respective positions of ones of the corresponding apparent features in each of the respective portions of visible light. In some embodiments the instructions are computer-executable to cause the processor to perform calculating respective contributions of the respective portions to the combined image data structure based at least in part on the misalignments. In some embodiments the instructions are computer-executable to cause the processor to perform generating a combined image data structure from the plurality of respective portions, based at least in part on the respective contributions of the respective portions to the combined image data structure.

In some embodiments the instructions are computer-executable to cause the processor to perform filtering the combined image data structure to extract grayscale information and differential color information at each pixel of a plurality of pixels of the combined image data structure. In some embodiments the instructions are computer-executable to cause the processor to perform calculating a channel average representing a spread in color information in the neighborhood of a given pixel of the combined image data structure, as compared to grayscale information in the neighborhood of the given pixel of the combined image data structure, and generating a final image including a proportion of the final image based on the image without filtering to chromatic information, and a proportion of the final image based on results of an averaging filter applied to the chromatic information.

In some embodiments the program instructions computer-executable to cause the processor to perform generating the combined image data structure from the plurality of respective portions, based at least in part on the respective contributions of the respective portions to the combined image data structure further include program instructions computer-executable to cause the processor to perform generating the combined image data structure at a spatial resolution higher than a resolution of one or more of the plurality of digital image sensor arrays.

In some embodiments, the program instructions computer-executable to cause the processor to perform identifying misalignments of the plurality of digital image sensor arrays based on comparison of respective positions of ones of the corresponding apparent features in each of the respective portions of visible light further include program instructions computer-executable to cause the processor to perform separately sampling data from the one or more of the plurality of digital image sensor arrays, and program instructions computer-executable to cause the processor to perform assessing the data for one or more of the position of one or more supposed edges.

In some embodiments, the program instructions computer-executable to cause the processor to perform identifying misalignments of the plurality of digital image sensor arrays based on comparison of respective positions of ones of the corresponding apparent features in each of the respective portions of visible light further include program instructions computer-executable to cause the processor to perform separately sampling data from the one or more of the plurality of digital image sensor arrays, and program instructions computer-executable to cause the processor to perform assessing the data for one or more of the height of one or more supposed stripes.

In some embodiments the instructions are computer-executable to cause the processor to perform filtering the combined image data structure to extract grayscale information and differential color information at each pixel of a plurality of pixels of the combined image data structure using an averaging filter to reduce color artifacts.

Some embodiments include a method for resampling image data from a plurality of image sensor arrays in a miniature camera. In some embodiments, the method includes receiving at a plurality of digital image sensor arrays a plurality of respective portions of visible incoming light arriving at a camera module. In some embodiments, each respective portion of the plurality of respective portions includes light of a wavelength range different from a wavelength range of another respective portion. In some embodiments, the method further includes calculating positions of a plurality of corresponding apparent features in each of the respective portions of visible light. In some embodiments, the method further includes identifying misalignments of the plurality of digital image sensor arrays based on comparison of respective positions of ones of the corresponding apparent features in each of the respective portions of visible light. In some embodiments, the method further includes calculating respective contributions of the respective portions to the combined image data structure based at least in part on the misalignments.

In some embodiments, the method further includes generating a combined image data structure from the plurality of respective portions, based at least in part on the respective contributions of the respective portions to the combined image data structure. In some embodiments, the method further includes filtering the combined image data structure to extract grayscale information and differential color information at each pixel of a plurality of pixels of the combined image data structure.

In some embodiments, the method further includes calculating a channel average representing a spread in color information in the neighborhood of a given pixel of the combined image data structure, as compared to grayscale information in the neighborhood of the given pixel of the combined image data structure. In some embodiments, the method further includes generating a final image including a proportion of the final image based on the image without filtering to chromatic information, and a proportion of the final image based on results of an averaging filter applied to the chromatic information.

In some embodiments, the generating the combined image data structure from the plurality of respective portions, based at least in part on the respective contributions of the respective portions to the combined image data structure further includes generating the combined image data structure at a spatial resolution higher than a resolution of one or more of the plurality of digital image sensor arrays. In some embodiments, the identifying misalignments of the plurality of digital image sensor arrays based on comparison of respective positions of ones of the corresponding apparent features in each of the respective portions of visible light further includes separately sampling data from the one or more of the plurality of digital image sensor arrays, and assessing the data for one or more of the position of one or more supposed edges.

In some embodiments, the identifying misalignments of the plurality of digital image sensor arrays based on comparison of respective positions of ones of the corresponding apparent features in each of the respective portions of visible light further includes separately sampling data from the one or more of the plurality of digital image sensor arrays, and assessing the data for one or more of the height of one or more supposed stripes.

In some embodiments, the method further includes filtering the combined image data structure to extract grayscale information and differential color information at each pixel of a plurality of pixels of the combined image data structure using an averaging filter to reduce color artifacts.

Some embodiments include a non-transitory computer-readable storage medium storing program instructions. In some embodiments the program instructions are computer-executable to implement receiving at a plurality of digital image sensor arrays a plurality of respective portions of visible incoming light arriving at a camera module. In some embodiments, each respective portion of the plurality of respective portions includes light of a wavelength range different from a wavelength range of another respective portion. In some embodiments the program instructions are computer-executable to implement calculating positions of a plurality of corresponding apparent features in each of the respective portions of visible light. In some embodiments the program instructions are computer-executable to implement identifying misalignments of the plurality of digital image sensor arrays based on comparison of respective positions of ones of the corresponding apparent features in each of the respective portions of visible light.

In some embodiments the program instructions are computer-executable to implement calculating respective contributions of the respective portions to the combined image data structure based at least in part on the misalignments. In some embodiments the program instructions are computer-executable to implement generating a combined image data structure from the plurality of respective portions, based at least in part on the respective contributions of the respective portions to the combined image data structure.

In some embodiments the program instructions are computer-executable to implement filtering the combined image data structure to extract grayscale information and differential color information at each pixel of a plurality of pixels of the combined image data structure.

In some embodiments the program instructions are computer-executable to implement calculating a channel average representing a spread in color information in the neighborhood of a given pixel of the combined image data structure, as compared to grayscale information in the neighborhood of the given pixel of the combined image data structure and generating a final image including a proportion of the final image based on the image without filtering to chromatic information, and a proportion of the final image based on results of an averaging filter applied to the chromatic information.

In some embodiments, the program instructions computer-executable to implement generating the combined image data structure from the plurality of respective portions, based at least in part on the respective contributions of the respective portions to the combined image data structure further include program instructions computer-executable to implement generating the combined image data structure at a spatial resolution higher than a resolution of one or more of the plurality of digital image sensor arrays.

In some embodiments, the program instructions computer-executable to implement identifying misalignments of the plurality of digital image sensor arrays based on comparison of respective positions of ones of the corresponding apparent features in each of the respective portions of visible light further include program instructions computer-executable to implement separately sampling data from the one or more of the plurality of digital image sensor arrays, and program instructions computer-executable to implement assessing the data for one or more of the position of one or more supposed edges.

In some embodiments, the program instructions computer-executable to implement identifying misalignments of the plurality of digital image sensor arrays based on comparison of respective positions of ones of the corresponding apparent features in each of the respective portions of visible light further include program instructions computer-executable to implement separately sampling data from the one or more of the plurality of digital image sensor arrays, and program instructions computer-executable to implement assessing the data for one or more of the height of one or more supposed stripes.

Some embodiments use a light splitting prism to substantially separate the incoming light by wavelength into red, green and blue components, separately directing each portion to one of the image sensors. In this way substantially all of the incoming light is utilized by some embodiments, whereas larger conventional image sensor that uses a 'color filter array' (CFA) to ensure that only light of specific wavelengths enters each light sensitive pixel. In this way, the CFA results in only approximately one third of the incoming light being used, the remaining two thirds being absorbed by the CFA.

To illustrate the comparison, an example conventional high end miniature camera uses a third inch image sensor, with a light sensitive array of 3288×2472 pixels (8.12MP total), each 1.5 um×1.5 um in size and pitch. For such an image sensor, the size of the array diagonal is roughly 6.17 mm.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 159 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1 shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 158 and applications (or sets of instructions) 136. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; state information that indicates which processes control output of shared audio or visual resource of a vehicle; ownership transition conditions of the shared audio or visual resource; and location information concerning the device's location and/or attitude.

Operating system 126 (e.g., Darwin, LINUX, UNIX, OS X, WINDOWS, or an embedded operating system such as VxWorks or RTXC) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of:
    weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video module and a music module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, and communication module 128, arbiter module 158 negotiates control of a shared audio or visual resource of an automobile. A request for control of a shared audio or visual resource of the vehicle is received at arbiter module 158. Arbiter module 158 maintains existing state information for ownership of the shared audio or visual resource and ownership transition conditions of the shared audio or visual resource. The request for control of the shared audio or visual resource of the vehicle is received from one of a plurality of processes including a process executing on an embedded system attached to the vehicle and a process executing on a mobile computing device (portable multifunction device 100) temporarily communicating with the vehicle. New state information regarding ownership of the shared audio or visual resource is determined by arbiter module 158 based at least in part on the request for control and the ownership transition conditions. The new state information indicates which of the processes controls output of the shared audio or visual resource of the vehicle. New ownership transition conditions of the shared audio or visual resource are determined by arbiter module 158 and communicated to a controller interface of the shared audio or visual resource.

In conjunction with RF circuitry 108, audio circuitry 110, speaker 111, microphone 113, touch screen 112, display controller 156, optical sensor 164, arbiter module 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 159, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

While a portable or mobile computing device is shown as one embodiment of a multifunction device, one of skill in the art will readily realize in light of having read the current disclosure that a desktop computer or other computing device may also perform many of the functions described herein without departing from the scope and intent of the present disclosure. Likewise, while touch screen devices are shown as one embodiment of a multifunction device, one of skill in the art will readily realize in light of having read the current disclosure that a desktop computer or other computing device without a touch screen may also perform many of the functions described herein without departing from the scope and intent of the present disclosure.

Figure 2:
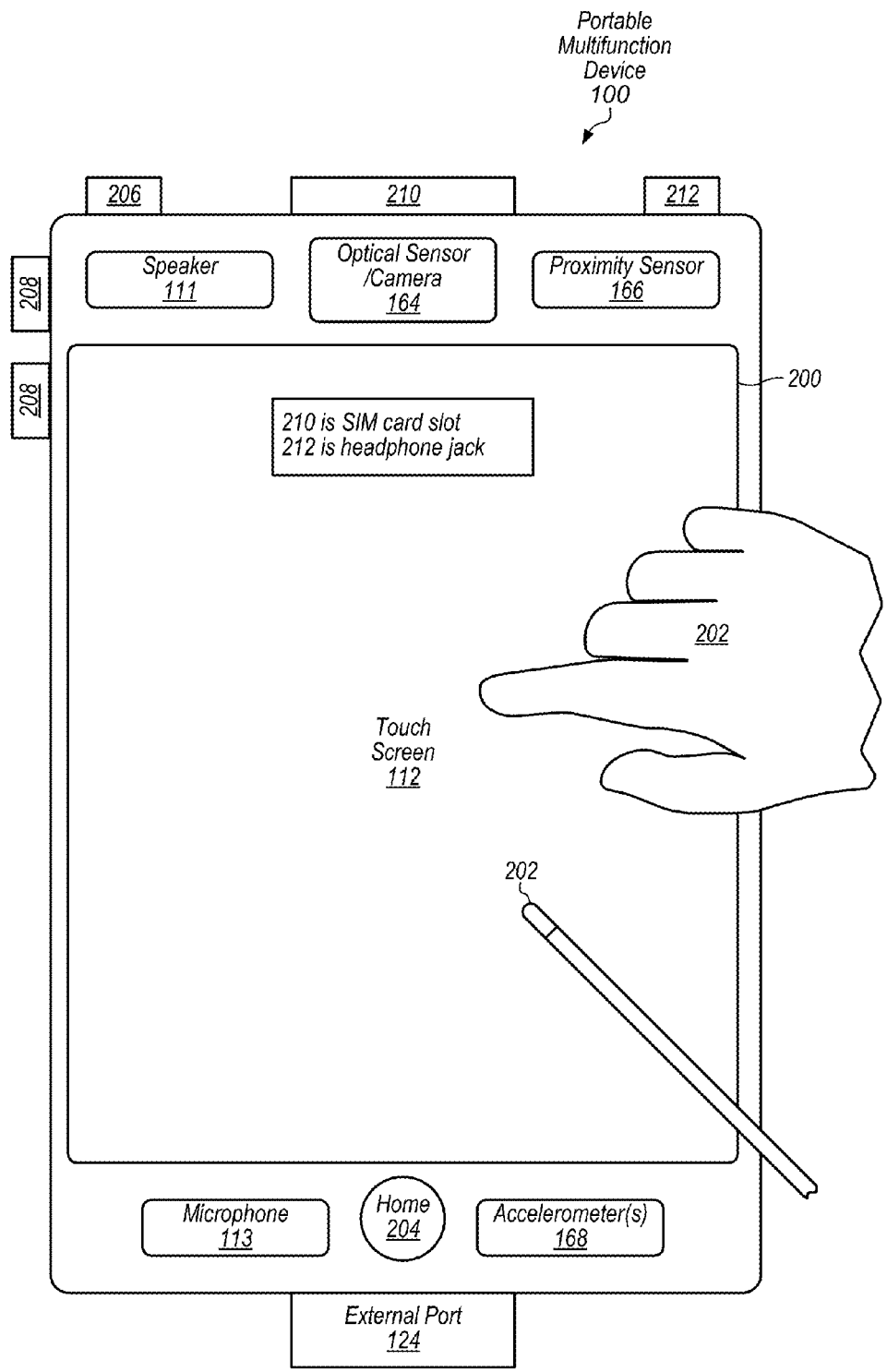
FIG. 2 illustrates a portable multifunction device in accordance with some embodiments.

FIG. 2 illustrates a portable multifunction device 100 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process.

In an alternative embodiment, device 100 also may accept verbal input for activation or deactivation of some functions through microphone 113.

Camera Component Configuration

In some embodiments incoming light focused through the optical lens elements passes through a further optical element which splits the light to follow different paths according to its wavelength, and hence directs the light on to one of plural image sensors. In this way a greater proportion of the captured light is usefully gathered by the light sensitive pixels, and a lower proportion is lost by being absorbed by color filters.

In some embodiments, the substrate architecture packages two or three image sensors that image light from a single optical stack. The concept uses a 'color-splitting component' to split the incoming light into three color bins (such as red, green and blue) and directly light in each bin solely onto one of the image sensors. In this way the incoming light is much more efficiently used. Unlike conventional image sensors, where a series of color filters are applied over the light sensitive pixels (for example in a Bayer pattern), and hence the majority of light is absorbed by the color filters and lost, some embodiments allow for a given lens image circle size, a higher resolution image can be recorded owing to the greater number of pixels and the more efficient use of light.

There are several possible camera architectures that could make use of this configuration, however, one important architecture is for a miniature zoom camera for use in mobile devices. For such a camera, the Z thickness of the camera is the most important dimension. One typical proposal to minimize the Z thickness is to fold the optics of the camera, such that the optical axis of most of the lens elements is orthogonal to the Z thickness direction. In such a configuration, the Z height of the camera is now determined by the diameter of the lens elements. For this reason, embodiments that reduce the image circle and hence the diameters of the lens elements will reduce the Z thickness. In addition, such a reduction in image circle also reduced the total track length (TTL) of the lens, also reducing the XY dimensions of the camera.

Camera Component Hardware Package Example

Figure 3:
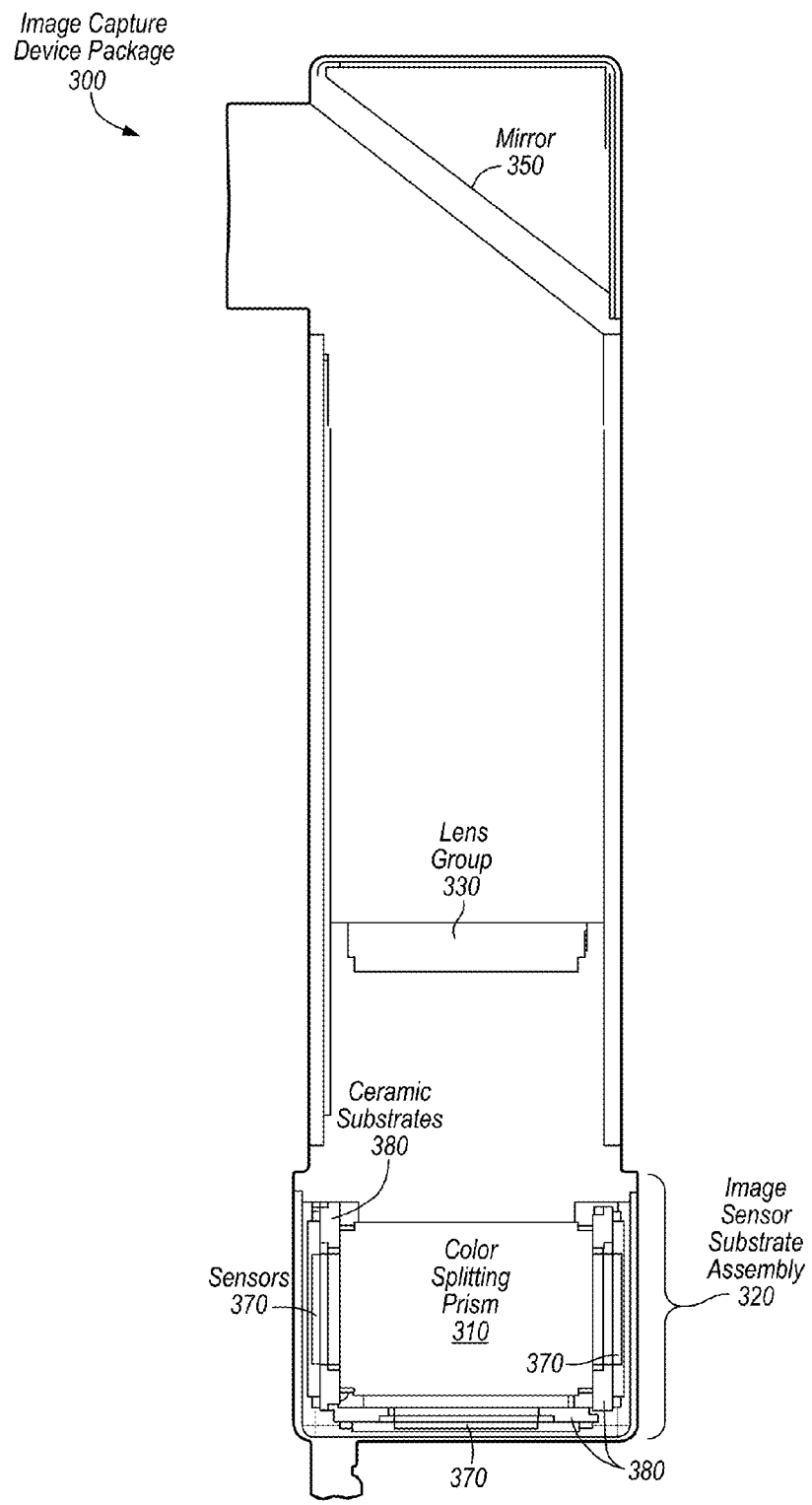
FIG. 3 depicts components of a camera for use in portable multifunction device in accordance with some embodiments.

FIG. 3 depicts a camera for use with in portable multifunction device in accordance with some embodiments. FIG. 3 shows a cross-sections through the optical stack of the camera (image capture device package 300), including a color-splitting prism 310, an image sensor substrate assembly 320, and a lens group 330, a mirror 350. Mirror 350 is used to fold the optics, and is, in some embodiments, nominally mounted at 45 degrees to the optical axis of all the lens elements. As can be observed in FIG. 3, the substrate assembly 320 is made up of three image sensors 370 and a prism 310, which splits the light into three color components, directing one color to each image sensor. In some embodiments, this tri-sensor arrangement is very efficient as little light is wasted in color filters, and hence minimizes the lens size for a given combined image sensor surface area. Ceramic substrates 380 are also shown. Note that, in some embodiments, only two of substrates 380 and image sensors 370 are included. Note that, in some embodiments, more than two of substrates 380 and image sensors 370 are included.

Figure 4:
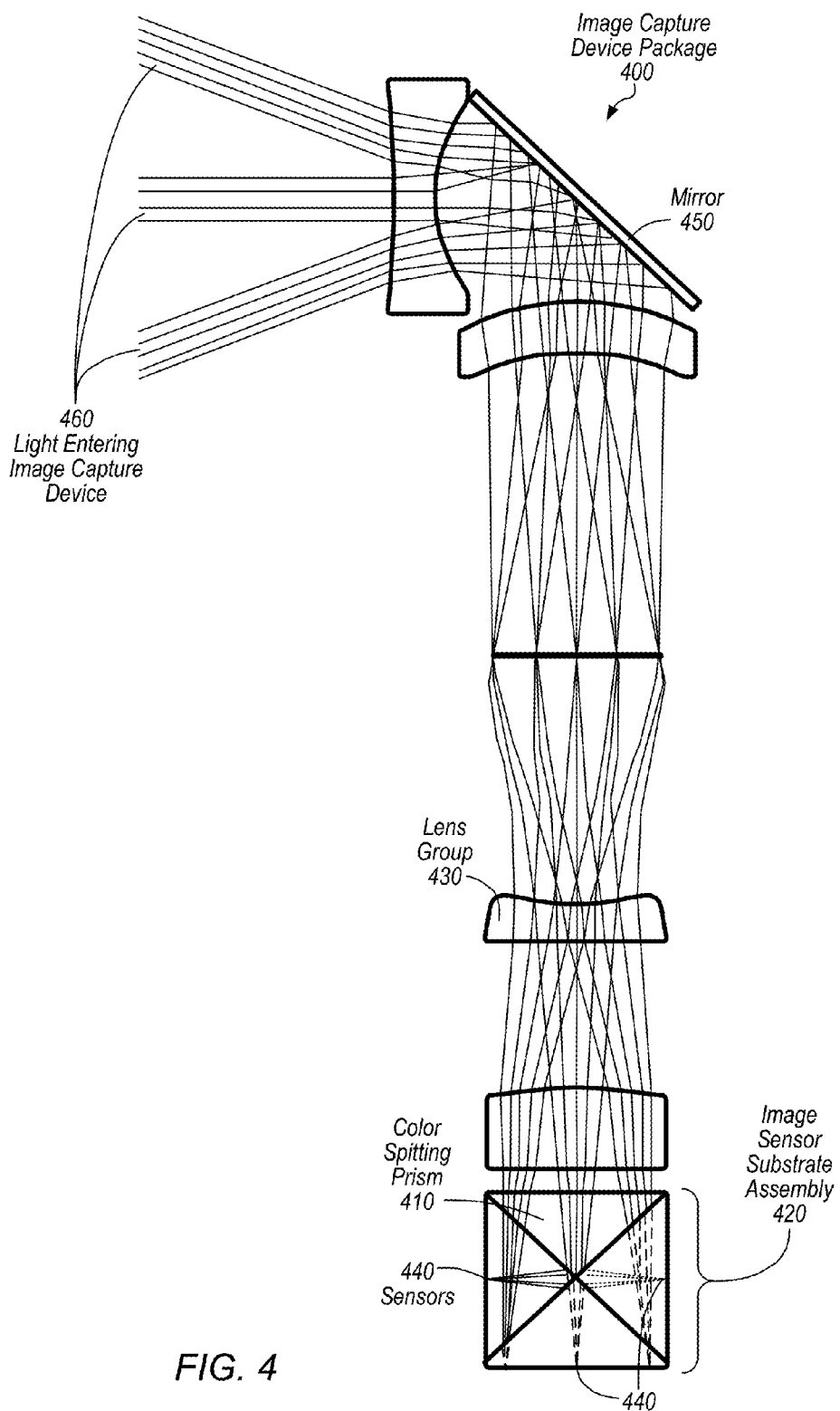
FIG. 4 illustrates a ray trace of light through a camera for use in a portable multifunction device in accordance with some embodiments.

FIG. 4 illustrates a ray trace of light through a camera for use in a portable multifunction device in accordance with some embodiments. An image capture device 400 is shown, as is light entering the image capture device 460, which reflects off of a mirror 450 lens group 430 before reaching an image sensor substrate assembly 420 including color splitting prism 410 that directs components of the light to sensors 440.

Figure 5:
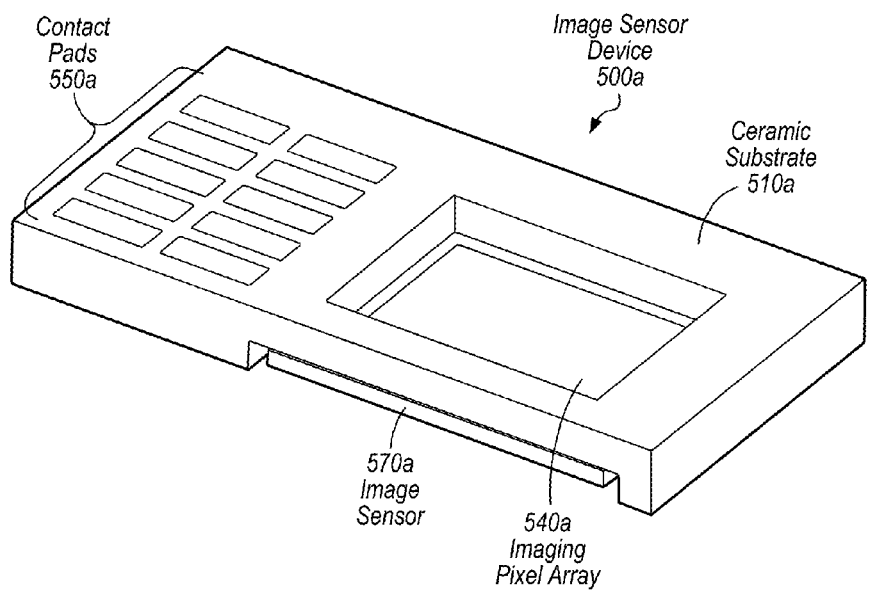
FIG. 5 illustrates an image sensor device including a flip-chip image sensor bonded to a ceramic substrate for use in a camera for use in a portable multifunction device in accordance with some embodiments.

FIG. 5 illustrates an image sensor device including a flip-chip image sensor bonded to a ceramic substrate for use in a camera for use in a portable multifunction device in accordance with some embodiments. An image sensor device 500a includes a ceramic substrate 510a with contact pads 550a and an image sensor 570a including an imaging pixel array 540a.

Figure 6:
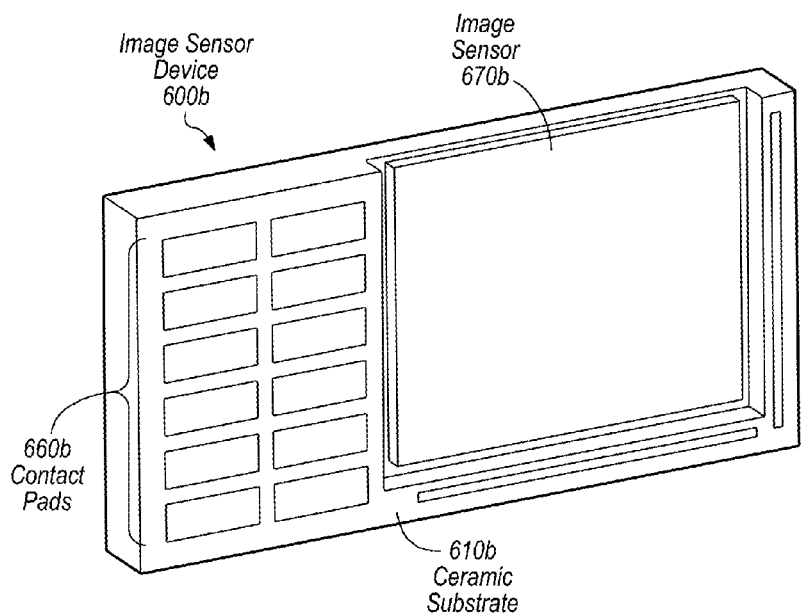
FIG. 6 depicts an image sensor device including a flip-chip image sensor bonded to a ceramic substrate for use in a camera for use in a portable multifunction device in accordance with some embodiments.

FIG. 6 depicts an image sensor device including a flip-chip image sensor bonded to a ceramic substrate for use in a camera for use in a portable multifunction device in accordance with some embodiments. An image sensor device 600b includes a ceramic substrate 610b with contact pads 660b and an image sensor 670b.

Figure 7:
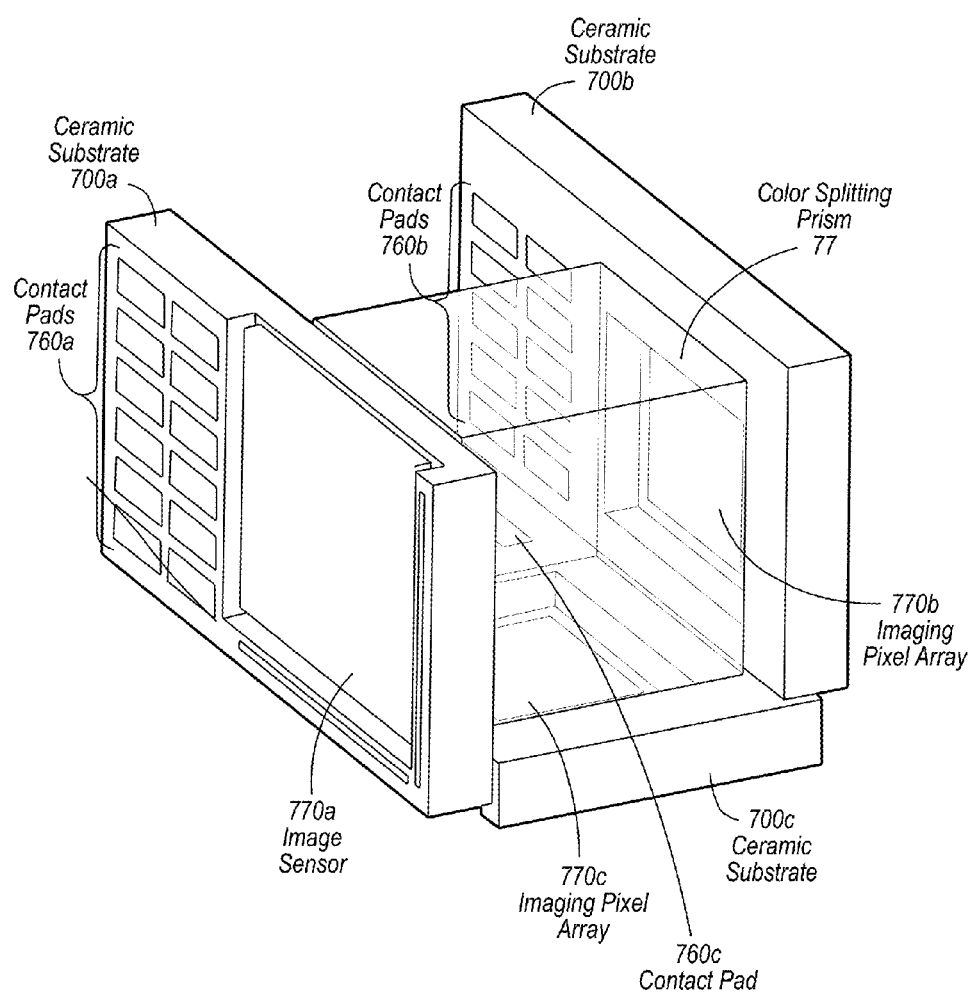
FIG. 7 illustrates articulation of a set of image sensor devices with a light splitting prism for use in a camera for use in a portable multifunction device in accordance with some embodiments.

FIG. 7 illustrates articulation of a set of image sensor devices with a light splitting prism for use in a camera for use in a portable multifunction device in accordance with some embodiments. Ceramic substrates 700*a-c* of image sensor devices are articulated touching one another and a color splitting prism 77. Each of ceramic substrates 700*a-c* is attached to respective contact pads 760*a-c* and a respective image sensor 770*a-c* including an imaging pixel array 770*b-c*.

Figure 8:
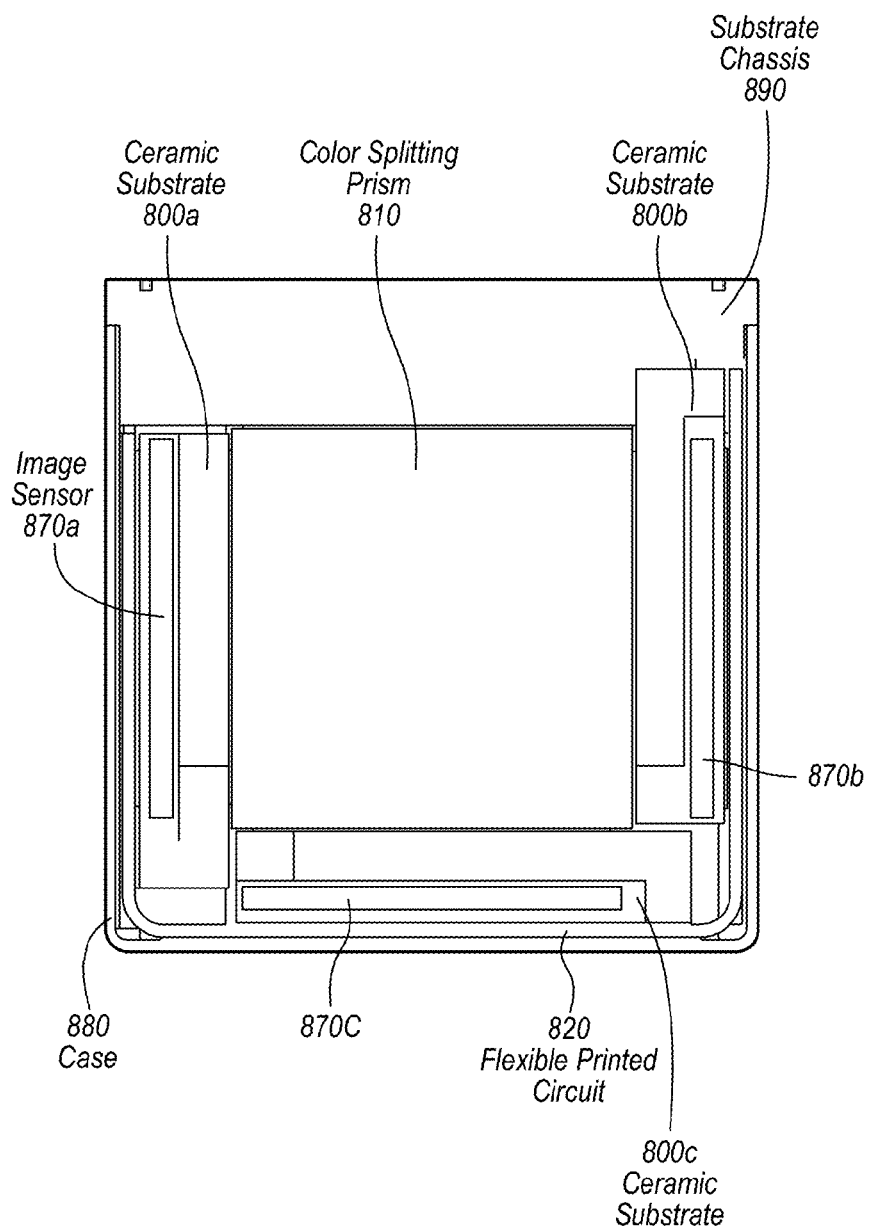
FIG. 8 depicts articulation of a set of image sensor devices with a light splitting prism for use in a camera for use in a portable multifunction device in accordance with some embodiments.

FIG. 8 depicts articulation of a set of image sensor devices with a light splitting prism for use in a camera for use in a portable multifunction device in accordance with some embodiments. Ceramic substrates 800*a-c* with attached image sensor devices 870*a*-870*c* are articulated around a color-splitting prism 810 using a substrate chassis 890 and a flexible printed circuit 820 within a case 880.

Figure 9:
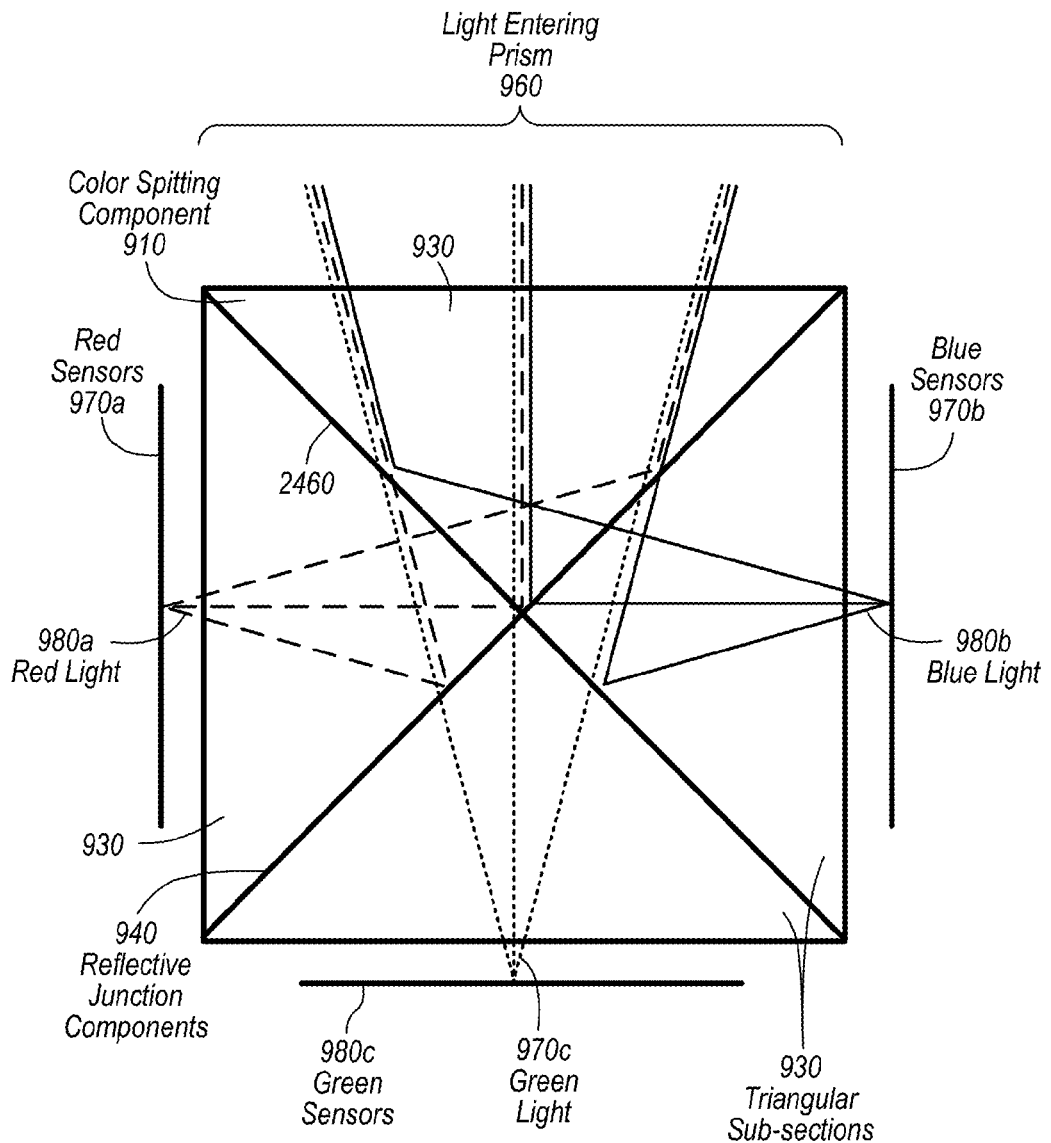
FIG. 9 depicts a ray trace of light through a light-splitting component of camera for use in a portable multifunction device in accordance with some embodiments.

FIG. 9 depicts a ray trace of light through a light-splitting component of camera for use in a portable multifunction device in accordance with some embodiments. In some embodiments, color splitting prisms used to split the light into the range of colors. While the Philips prism is common, smaller cube solutions are also used in some embodiments. A color-splitting component 910 and red sensors 970*a*, blue sensors 970*b* and green sensors 970*c*. Light entering color-splitting component 960 is divided into blue light 980*b*, which is sent to blue sensors 970*b*, red light 980*a*, which is sent to red sensors 970*a*, and green light 980*c*, which is sent to green sensors 970*c*. Color-splitting component 910 is built from triangular sub-sections 930 that meet at selectively reflective junction components 940. It may be appreciated based on the rays in FIG. 9 that an image sensor facing the top side of the component (green sensors 980*c*) would substantially receive green light 970*c* only, an image sensor facing the left side of the component (blue sensors 970*b*) would substantially receive blue light 980*b* only and an image sensor facing the right (red sensor 970*a*) surface of the component will substantially receive red light 980*a* only.

Example Operations

Figure 10:
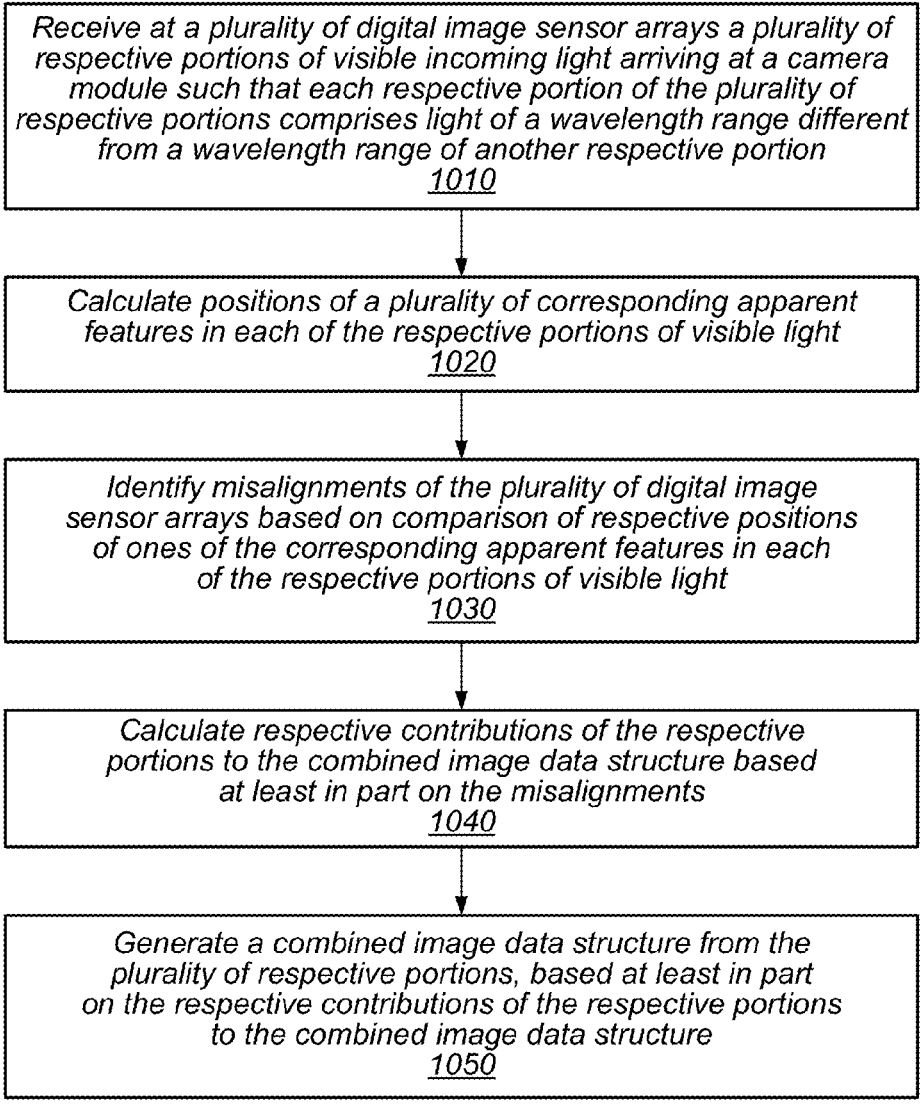
FIG. 10 is a flow diagram illustrating one embodiment of a method for providing super-resolution on image data structures using a set of image sensor devices with a light splitting prism according to some embodiments.

FIG. 10 is a flow diagram illustrating one embodiment of a method for providing super-resolution on image data structures using a set of image sensor devices with a light splitting prism according to some embodiments. In some embodiments, light is routed through a receptacle of a camera module and a lens of the camera module to color-splitting component to a plurality of digital sensor arrays. A plurality of respective portions of visible incoming light arriving at a camera module is received at a plurality of digital image sensor arrays such that each respective portion of the plurality of respective portions comprises light of a wavelength range different from a wavelength range of another respective portion (block 1010). Positions of a plurality of corresponding apparent features in each of the respective portions of visible light are calculated (block 1020). Misalignments of the plurality of digital image sensor arrays are identified based at least in part on comparison of respective positions of ones of the corresponding apparent features in each of the respective portions of visible light (block 1030). Respective contributions of the respective portions to the combined image data structure are calculated based at least in part on the misalignments (block 1040). A combined image data structure is generated from the plurality of respective portions, based at least in part on the respective contributions of the respective portions to the combined image data structure (block 1050).

Figure 11:
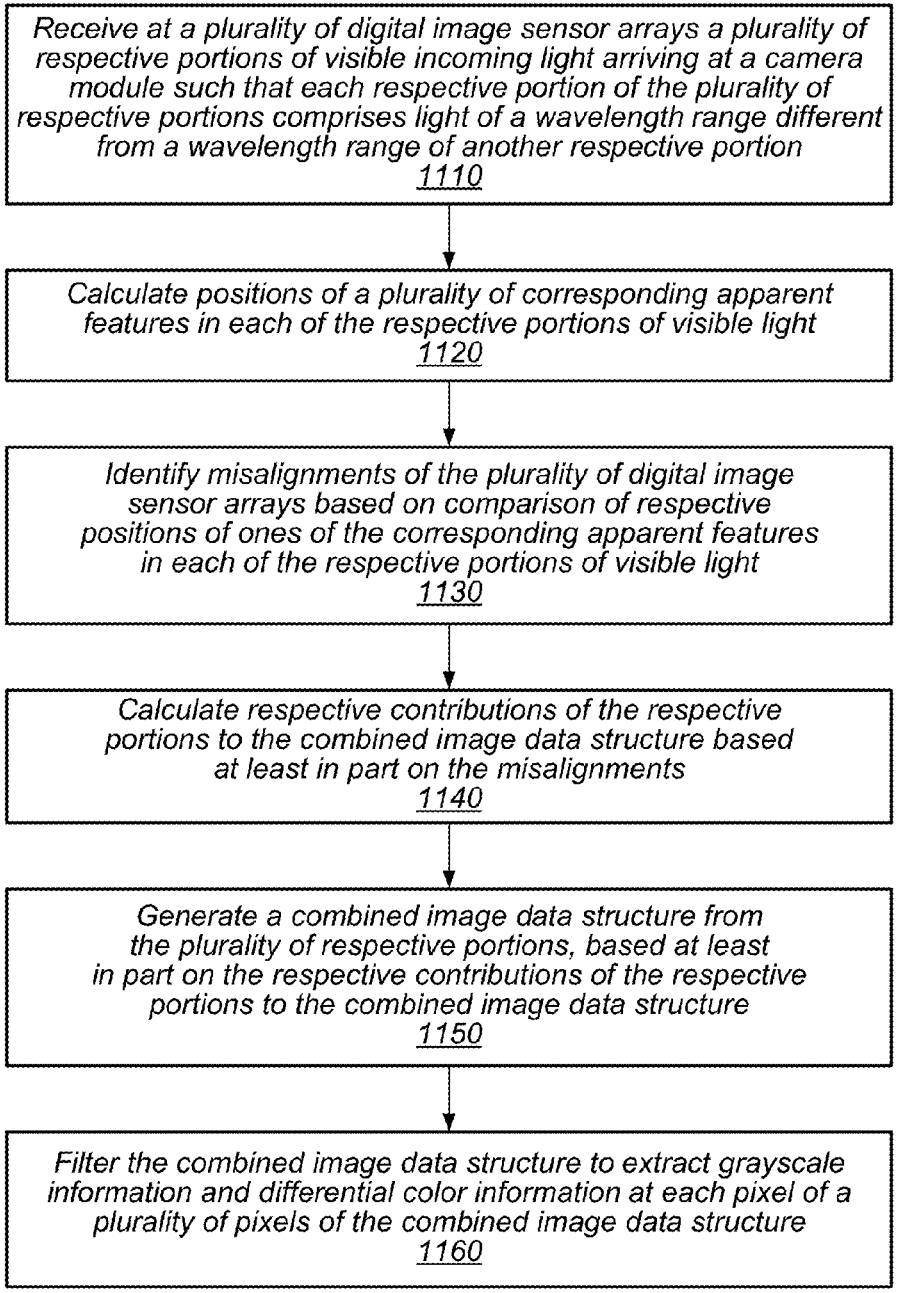
FIG. 11 is a flow diagram illustrating one embodiment of a method for providing super-resolution on image data structures using a set of image sensor devices with a light splitting prism according to some embodiments.

FIG. 11 is a flow diagram illustrating one embodiment of a method for providing super-resolution on image data structures using a set of image sensor devices with a light splitting prism according to some embodiments. A plurality of respective portions of visible incoming light arriving at a camera module are received at a plurality of digital image sensor arrays such that each respective portion of the plurality of respective portions comprises light of a wavelength range different from a wavelength range of another respective portion (block 1110). Positions of a plurality of corresponding apparent features in each of the respective portions of visible light are calculated (block 1120). Misalignments of the plurality of digital image sensor arrays are identified based at least in part on comparison of respective positions of ones of the corresponding apparent features in each of the respective portions of visible light (block 1130). Respective contributions of the respective portions to the combined image data structure are calculated based at least in part on the misalignments (block 1140). A combined image data structure is generated from the plurality of respective portions, based at least in part on the respective contributions of the respective portions to the combined image data structure (block 1150). The combined image data structure is filtered to extract grayscale information and differential color information at each pixel of a plurality of pixels of the combined image data structure (block 1160).

Figure 12:
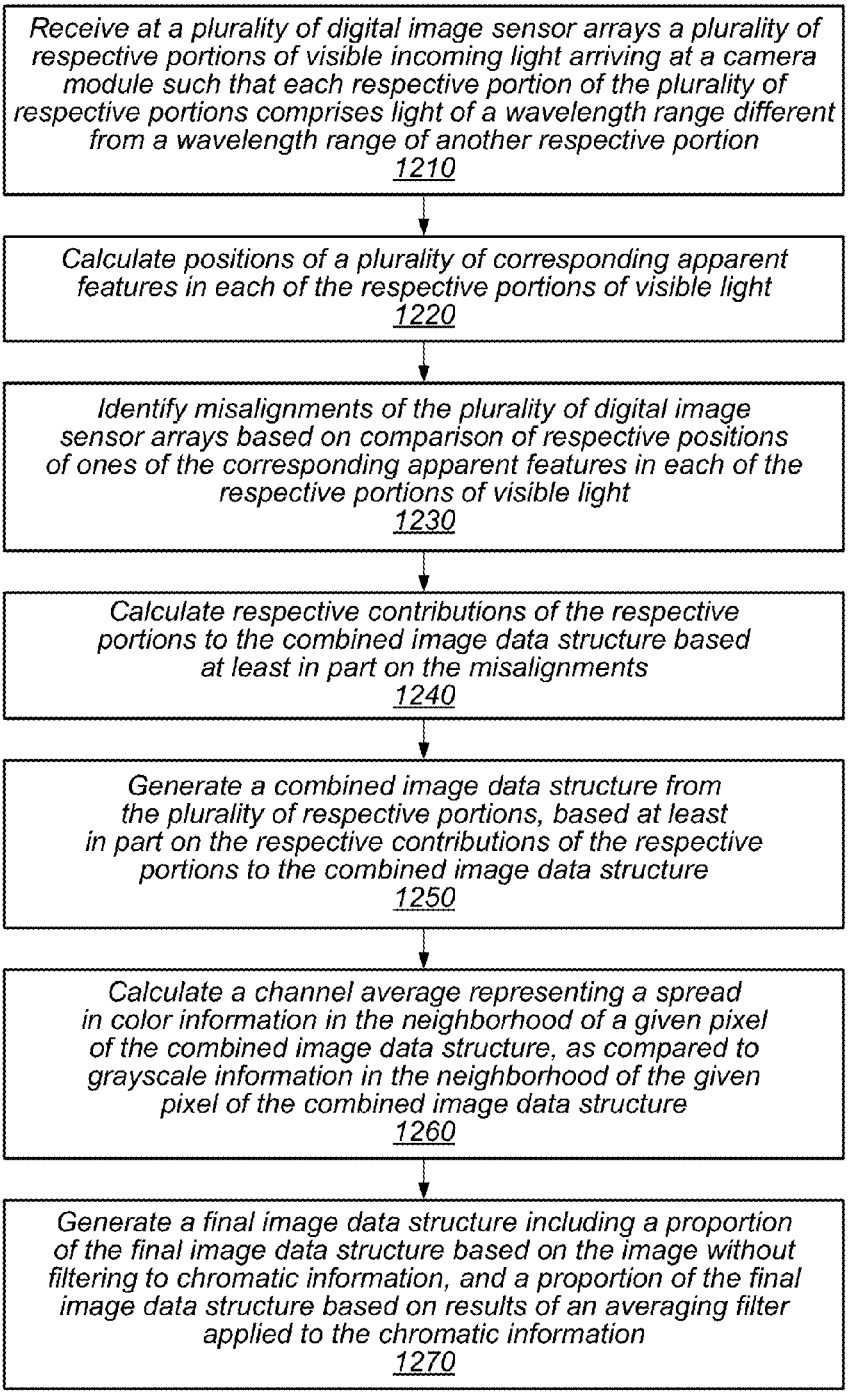
FIG. 12 is a flow diagram illustrating one embodiment of a method for providing super-resolution on image data structures using a set of image sensor devices with a light splitting prism according to some embodiments.

FIG. 12 is a flow diagram illustrating one embodiment of a method for providing super-resolution on image data structures using a set of image sensor devices with a light splitting prism according to some embodiments. A plurality of respective portions of visible incoming light arriving at a camera module is received at a plurality of digital image sensor arrays such that each respective portion of the plurality of respective portions comprises light of a wavelength range different from a wavelength range of another respective portion (block 1210). Positions of a plurality of corresponding apparent features in each of the respective portions of visible light are calculated (block 1220). Misalignments of the plurality of digital image sensor arrays are identified based on comparison of respective positions of ones of the corresponding apparent features in each of the respective portions of visible light (block 1230). Respective contributions of the respective portions to the combined image data structure are calculated based at least in part on the misalignments (block 1240). A combined image data structure is generated from the plurality of respective portions, based at least in part on the respective contributions of the respective portions to the combined image data structure (block 1250). A channel average representing a spread in color information in the neighborhood of a given pixel of the combined image data structure, as compared to grayscale information in the neighborhood of the given pixel of the combined image data structure is calculated (block 1260). A final image data structure is generated, including a proportion of the final image data structure based on the image without filtering to chromatic information, and a proportion of the final image data structure based on results of an averaging filter applied to the chromatic information (block 1270).

Figure 13:
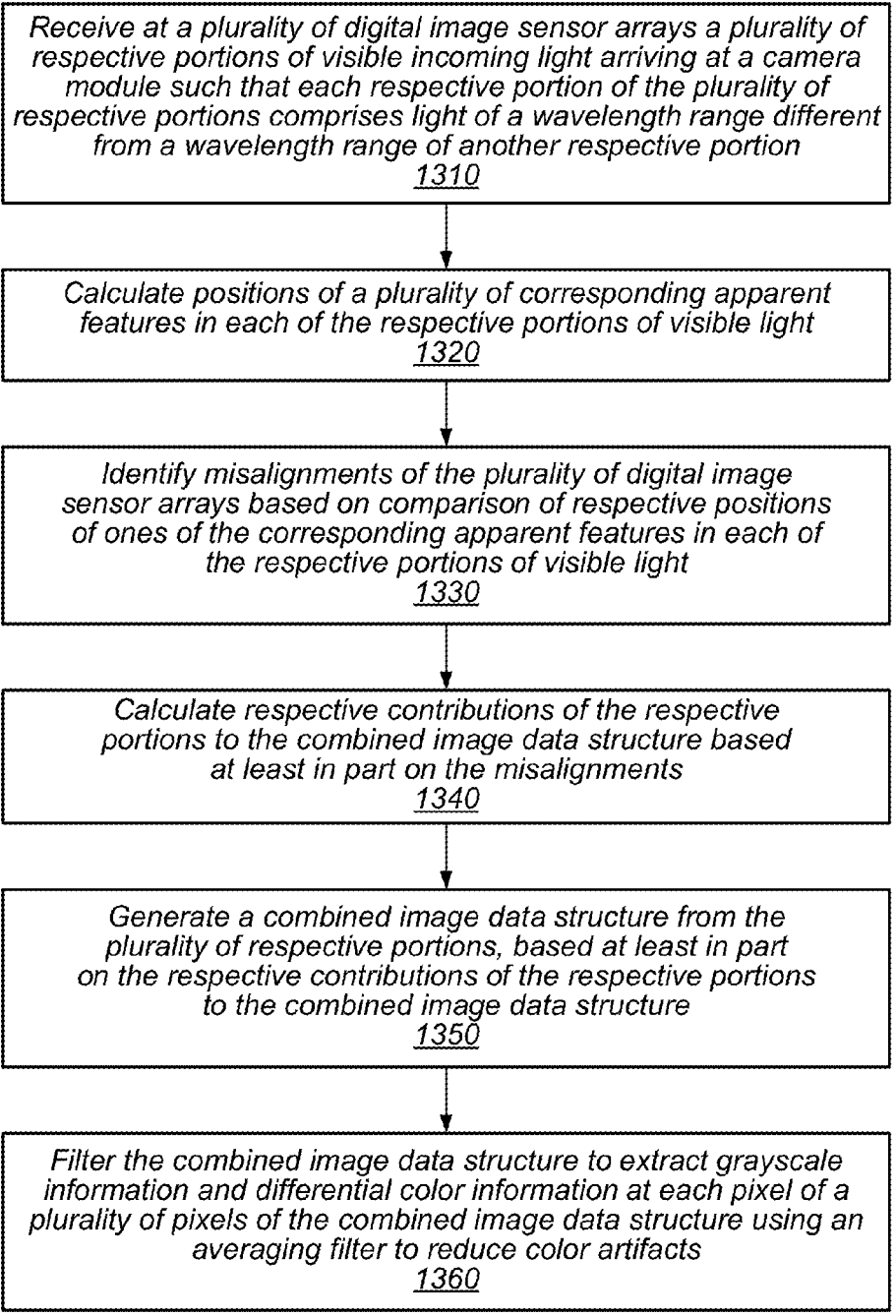
FIG. 13 is a flow diagram illustrating one embodiment of a method for providing super-resolution on image data structures using a set of image sensor devices with a light splitting prism according to some embodiments.

FIG. 13 is a flow diagram illustrating one embodiment of a method for providing super-resolution on image data structures using a set of image sensor devices with a light splitting prism according to some embodiments. A plurality of respective portions of visible incoming light arriving at a camera module are received at a plurality of digital image sensor arrays such that each respective portion of the plurality of respective portions comprises light of a wavelength range different from a wavelength range of another respective portion (block 1310). Positions of a plurality of corresponding apparent features in each of the respective portions of visible light are calculated (block 1320). Misalignments of the plurality of digital image sensor arrays are identified based at least in part on comparison of respective positions of ones of the corresponding apparent features in each of the respective portions of visible light (block 1330). Respective contributions of the respective portions to the combined image data structure are calculated based at least in part on the misalignments (block 1340). A combined image data structure is generated from the plurality of respective portions, based at least in part on the respective contributions of the respective portions to the combined image data structure (block 1350). The combined image data structure is filtered to extract grayscale information and differential color information at each pixel of a plurality of pixels of the combined image data structure using an averaging filter to reduce color artifacts (block 1360).

Figure 14:
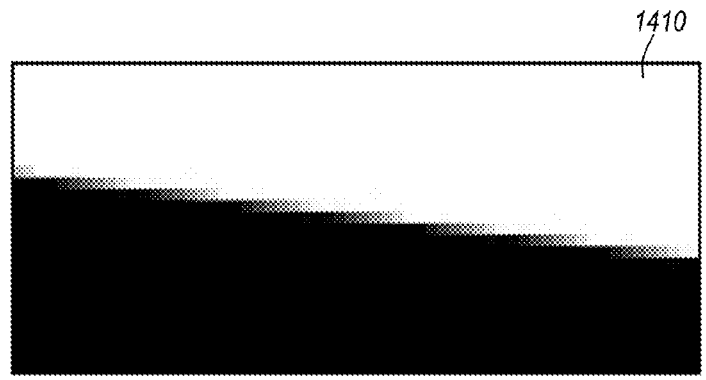
FIG. 14 illustrates results of Bayer sampling and a demosaic algorithm for use in a camera for use in a portable multifunction device in accordance with some embodiments
Figure 14:
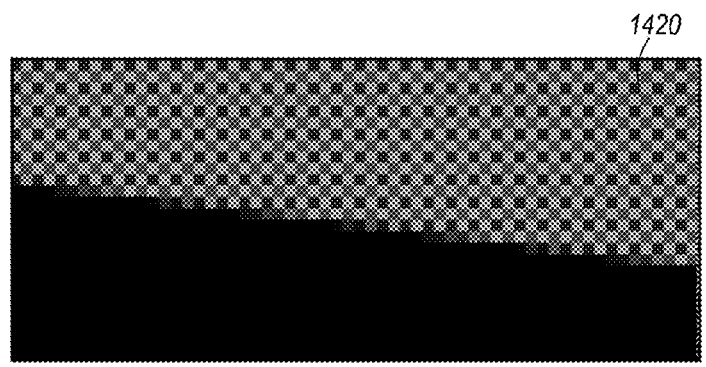
Figure 14:
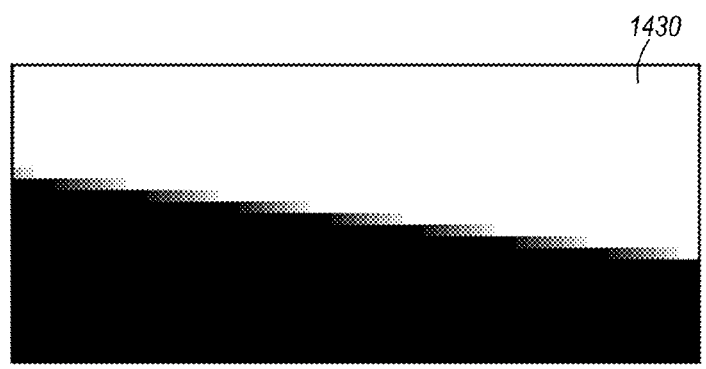

FIG. 14 illustrates results of Bayer sampling and a demosaic algorithm for use in a camera for use in a portable multifunction device in accordance with some embodiments. An RGB result of a de-mosaic algorithm on a Bayer sampled image 1410 is shown, as are a Bayer sampling of a blacked and white 'slanted edge' target 1420 and an ideal sampling of a black and white 'slanted edge' target. It is typical to use a CFA arranged in a Bayer pattern, where there are twice as many green pixels as red and blue; green being more closely associated with luminance and hence grayscale resolution, based on human perception.

In this way, there are roughly 4.06MP of green, and 2.03MP each of red and blue, with the result that an algorithm is used to take these red, green and blue sampled data, and create a final 8.12MP image, where there is red, green and blue (RGB) information at each pixel. The algorithm that generates this upscaled RGB image is called the 'de-mosaic algorithm'. If the de-mosaic algorithm performs very well, the image quality of the final image is comparable to an image where red, green and blue data was actually captured at each pixel location. In this way, the de-mosaic algorithm is interpolating approximately two thirds of the final data, but the output is an 8.12MP raw image.

In some embodiments of a camera architecture, there are three images sensors, each with an array of 2560×1920 of light sensitive pixels (4.9MP total), each 1.12 um×1.12 um in size and pitch. For such image sensors, the size of the array diagonal is roughly 3.58 mm. There are no CFA's, and the prism splits the light to each, providing, for a given image, we have 4.9MP each of red, green and blue. Some embodiments combine these data to deliver the optimal resulting image quality, which is at least comparable to the 8.12MP conventional resolution. It may be appreciated by those of skill in the art in light of having read the present disclosure that for the new architecture, each image uses 14.7 million pieces of information, rather than 8.12 million in the conventional case. Generating a 4.9MP RGB image is not of comparable resolution to the competing 8.12MP RGB image. Some embodiments include a super-resolution method that delivers approximately 19.6MP sized RGB images from the three 4.9MP red, green and blue sampled images. It should be noted that some embodiments of the de-mosaic methods and the super-resolution methods of the present invention are very similar: the de-mosaic algorithm may be considered as a super-resolution algorithm.

Some embodiments exploit that practical deployments of the three image sensors are not perfectly aligned with each other meaning that in aggregate the image is being sampled at a spacing less than the pixel pitch of each image sensor. This allows sub-pixel interpolation increasing the output resolution.

Figure 15:
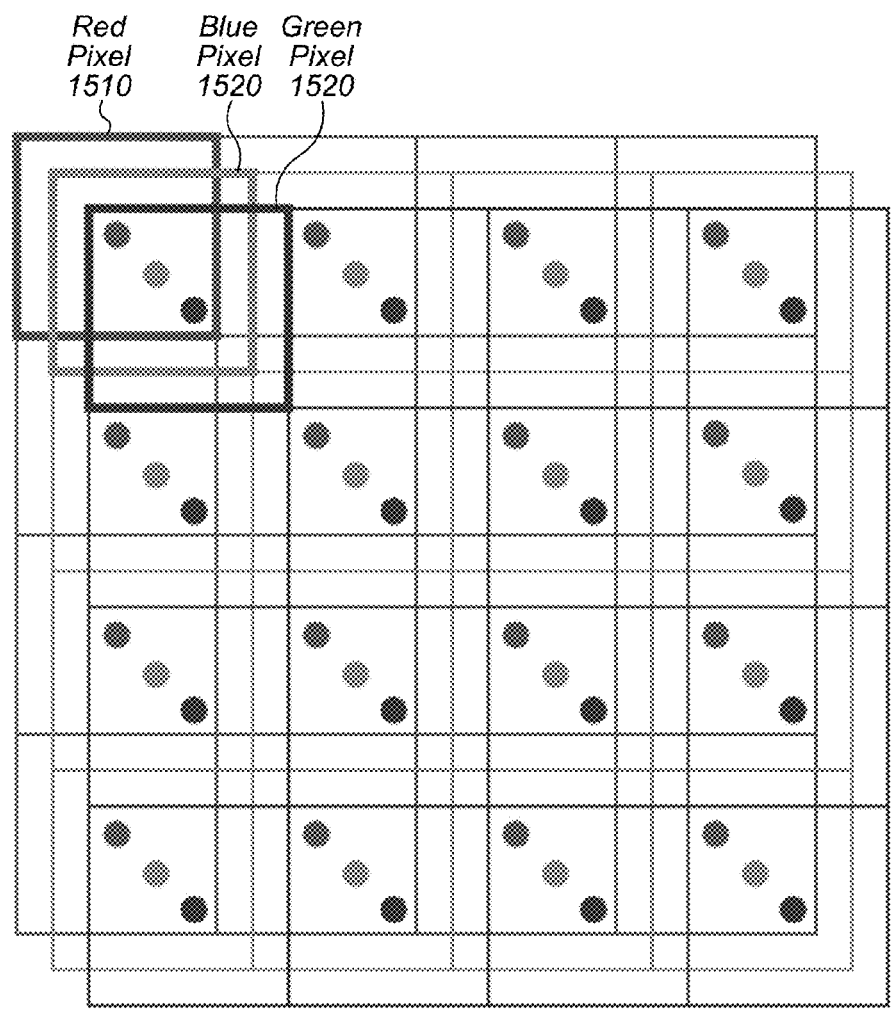
FIG. 15 depicts an example of pixel offset sampling of a color array resulting in sub-pixel sampling for use in a camera for use in a portable multifunction device in accordance with some embodiments.

FIG. 15 depicts an example of pixel offset sampling of a color array resulting in sub-pixel sampling for use in a camera for use in a portable multifunction device in accordance with some embodiments. A red pixel 1510, a blue pixel 1520, and a green pixel 1530 are offset from each other.

Figure 16:
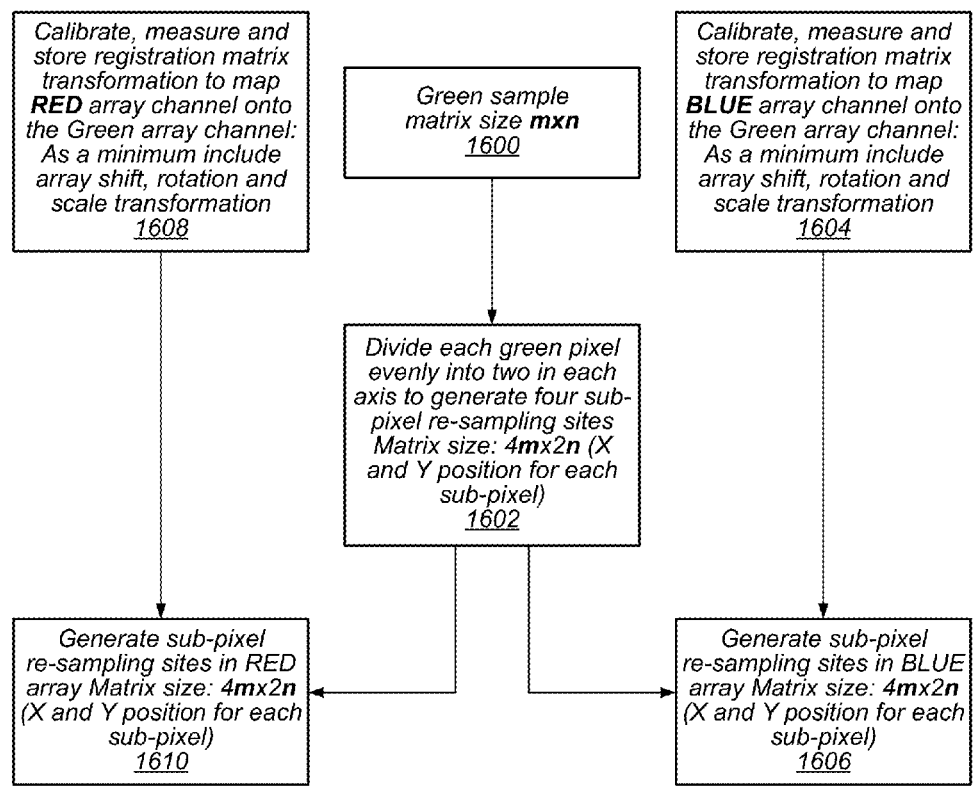
FIG. 16 illustrates a method registering sub-pixel resampling site positions onto array channels for use in a camera for use in a portable multifunction device in accordance with some embodiments.

FIG. 16 illustrates a method registering sub-pixel resampling site positions onto array channels for use in a camera for use in a portable multifunction device in accordance with some embodiments. FIG. 16 illustrates how the re-sampling sub-pixel sites are determined. At each pixel site, the aim of the re-sampling algorithm is to determine the red, green and blue value based on the sampled data.

A green sample matrix of size m×n is captured (block 1600). Each green pixel is divided evenly into two in each axis to generate four sub-pixel re-sampling sites for a matrix size: 2m×2n (X and Y position for each sub-pixel) (block 1602). A registration matrix transformation to map BLUE array channel onto the Green array channel is calibrated, measured and stored. In some embodiments, as a minimum, array shift, rotation and scale transformations are included (block 1604). Sub-pixel re-sampling sites in BLUE array are generated for a matrix size: 2m×2n (X and Y position for each sub-pixel) (block 1606). A registration matrix transformation to map RED array channel onto the Green array channel is calibrated, measured and stored. In some embodiments, as a minimum, array shift, rotation and scale transformation are included (block 1608). Sub-pixel re-sampling sites in RED array are generated for a matrix size: 2m×2n (X and Y position for each sub-pixel) (block 1610).

Figure 17:
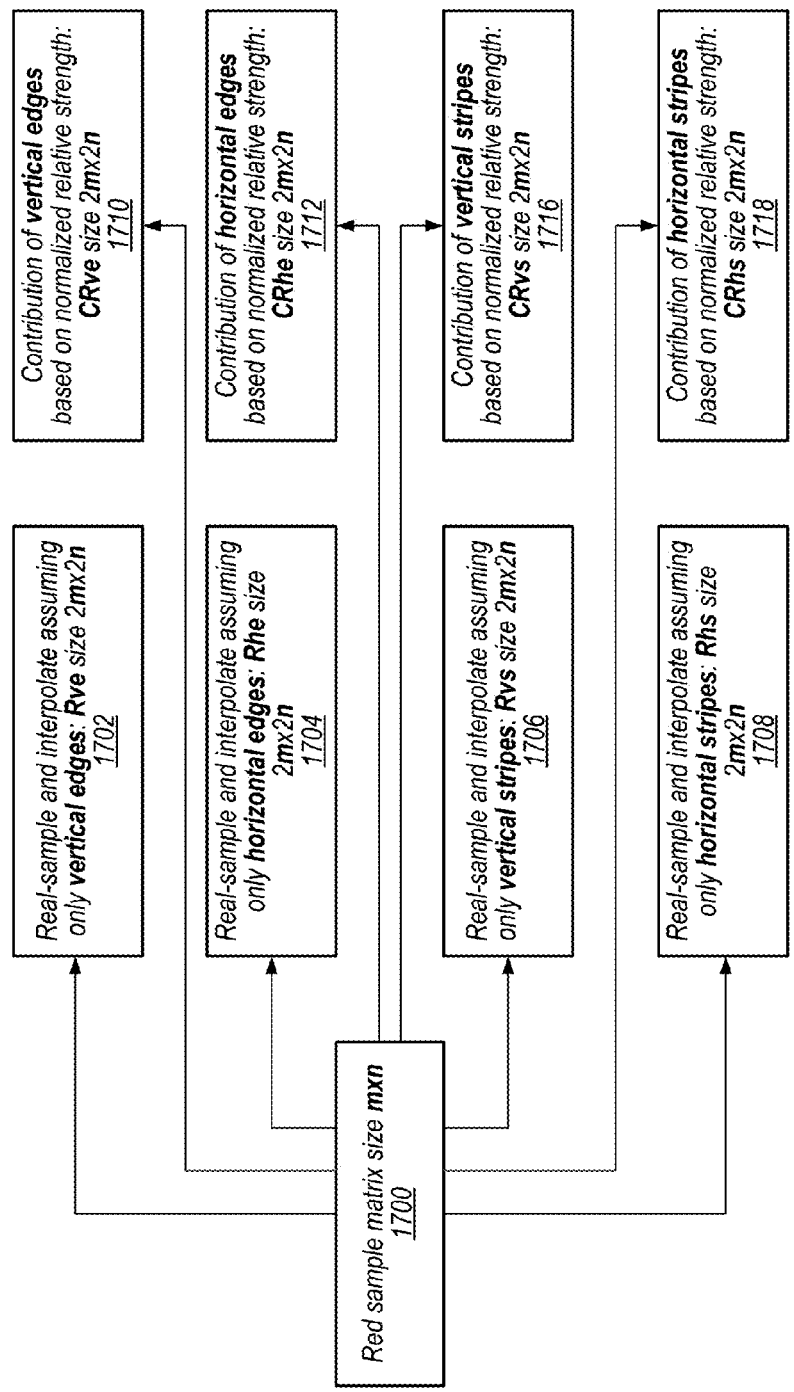
FIG. 17 depicts a method for estimating red re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments.

FIG. 17 depicts a method for estimating red re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments. One of skill in the art will see from the operations depicted in FIG. 4 that for each color, there are four separate re-sampling calculations, each of which yields a matrix of values for the re-sampled array; one for each sub-pixel. These four separate calculations are each based on a different assumption about the underlying cause for the information in the image: Vertical edges, Horizontal edges, Vertical stripes, and Horizontal stripes.

In each case, making the respective assumption enables deterministic calculations to estimate the values of the re-sampled sub-pixels. Separate to these calculations, a further series of calculations assesses the 'strength' of each underlying cause at each sub-pixel. Based on these 'strength' values, it is possible to estimate the 'contribution' of each underlying cause to the final pixel value. At this stage, these contribution calculations are separately calculated for each channel.

So, for example, at a particular sub-pixel, the normalized contribution due to, say, a vertical edge is equal to the 'strength' of the vertical edge, divided by the sum of the strengths of the vertical edge, horizontal edge, vertical stripe and horizontal stripe.

In this way, the contributions due to these four factors are normalized, such that they sum to one. There is a special case, where the 'strengths' of all four factors may all be zero, in which case we potentially have a 'divide by zero' problem. However it is straightforward to spot this particular case, and in situations where the strengths are all zero, the contribution of each cause is set to 0.25 (i.e. equal contributions between all four factors). This is an acceptable condition, because in such circumstances, there is essentially no information in the image, and the sub-pixel is in a region of flat color.

In more detail, consider the re-sampling calculation based on assuming the underlying cause of information at a certain pixel is a vertical edge. The first stages of the calculation are carried out on the sampled data (separately for each channel). For example, consider this calculation carried out on the red channel. As one of skill in the art will readily comprehend in light of having read the present disclosure, similar discussion applies for the other color channels, which is reflected in FIGS. 18-19, discussed below.

A red sample matrix of size m×n is generated (block 1700). Re-sampling and interpolation are performed assuming only vertical edges: Rve size 2m×2n (block 1702). Re-sampling and interpolation are performed assuming only horizontal edges. Rhe size 2m×2n (block 1704). Re-sampling and interpolation are performed assuming only vertical stripes. Rvs size 2m×2n (block 1706). Re-sampling and interpolation are performed assuming only horizontal stripes. Rhs size 2m×2n (block 1708). Contribution of vertical edges is calculated based on normalized relative strength. CRve size 2m×2n (block 1710). Contribution of horizontal edges is calculated based on normalized relative strength. CRhe size 2m×2n (block 1712). Contribution of vertical stripes is calculated based on normalized relative strength. CRvs size 2m×2n (block 1716). Contribution of horizontal stripes is calculated based on normalized relative strength. CRhs size 2m×2n (block 1718).

Figure 18:
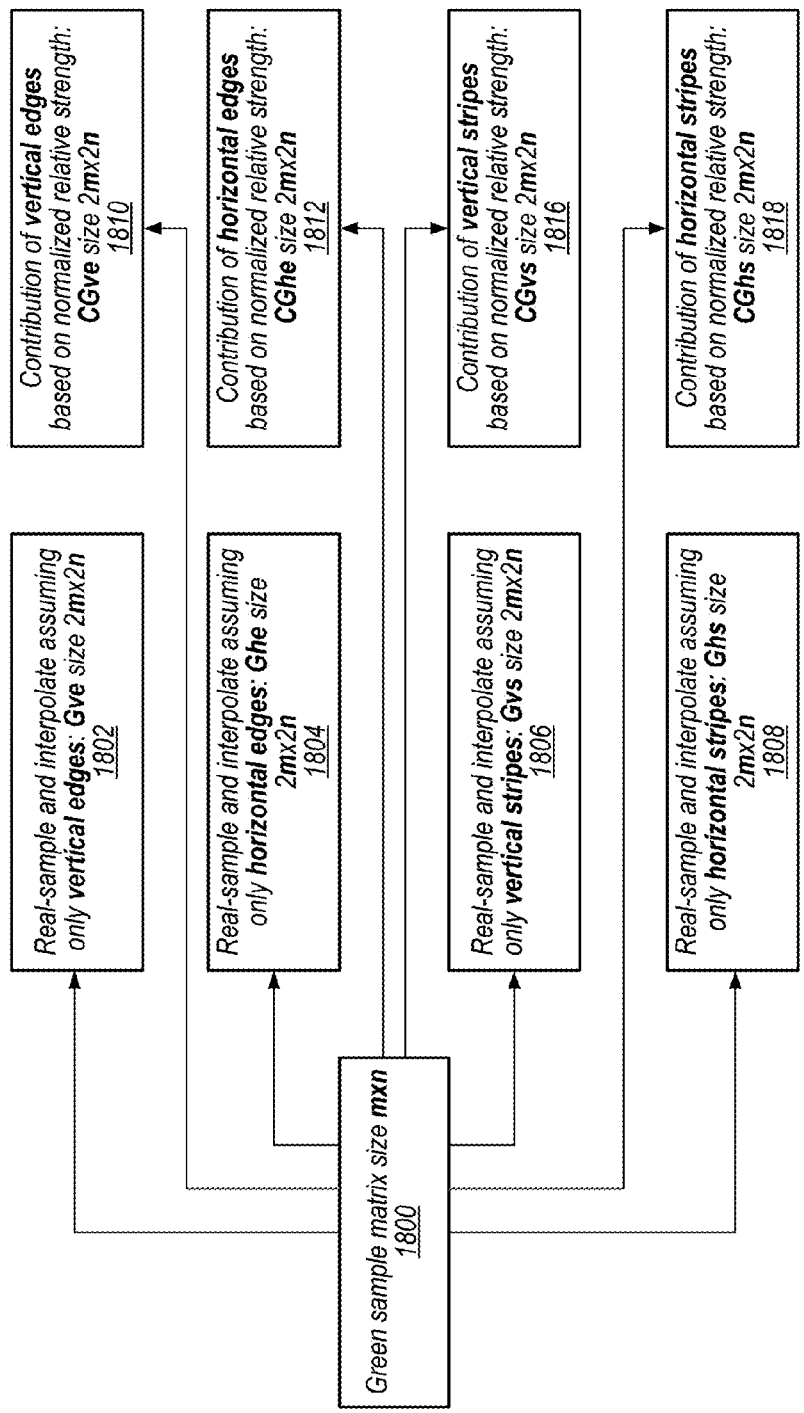
FIG. 18 illustrates a method for estimating green re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments.

FIG. 18 illustrates a method for estimating green re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments. A Green sample of matrix size m×n is calculated (block 1800). Re-sampling and interpolation (assuming only vertical edges) are performed. Gve size 2m×2n (block 1802). Re-sampling and interpolation is performed, assuming only horizontal edges. Ghe size 2m×2n (block 1804). Re-sampling and interpolation is performed, assuming only vertical stripes. Gvs size 2m×2n (block 1806). Re-sampling and interpolation are performed, assuming only horizontal stripes. Ghs size 2m×2n (block 1808). Contribution of vertical edges based on normalized relative strength is calculated. CGve size 2m×2n (block 1810). Contribution of horizontal edges based on normalized relative strength is calculated. CGhe size 2m×2n (block 1812). Contribution of vertical stripes based on normalized relative strength is calculated. CGvs size 2m×2n (block 1816). Contribution of horizontal stripes based on normalized relative strength is calculated. CGhs size 2m×2n (block 1818).

Figure 19:
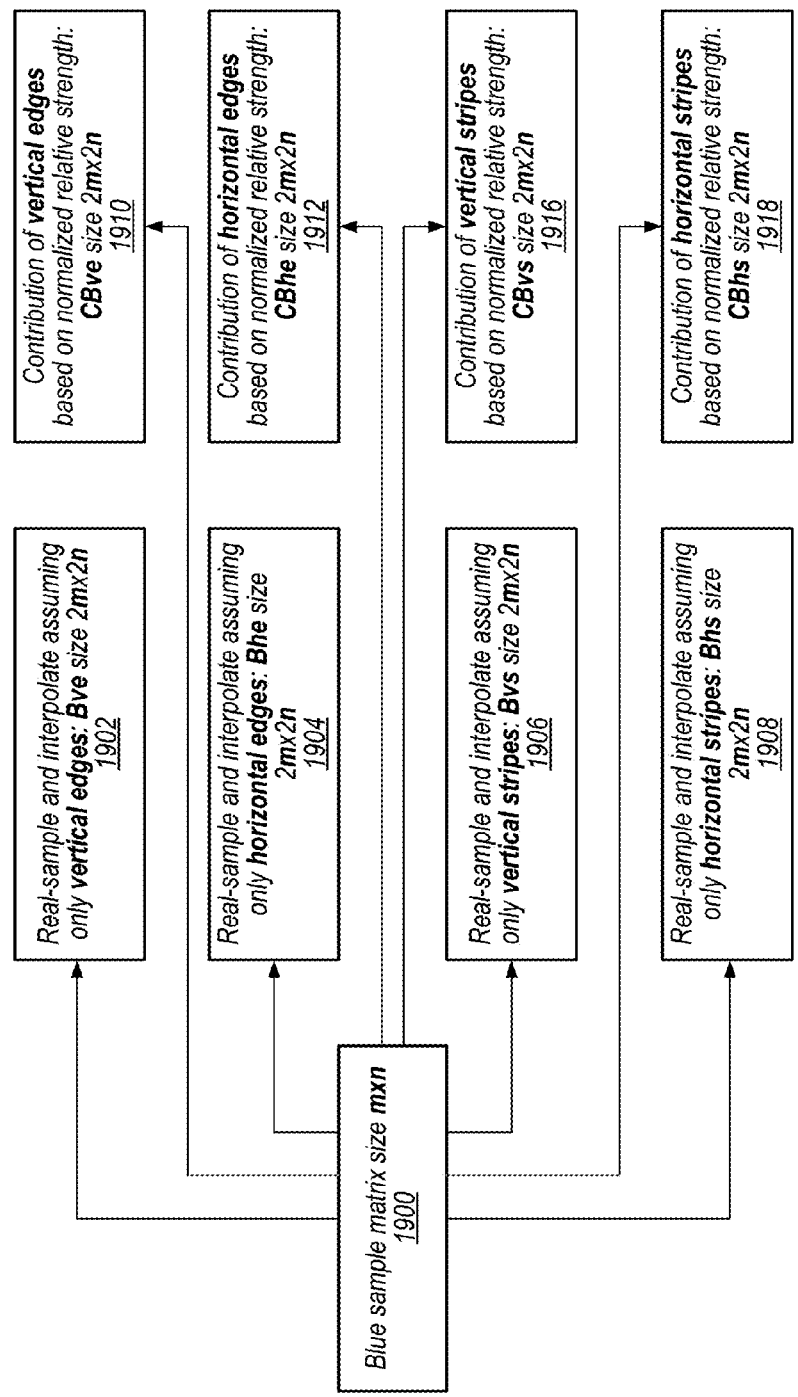
FIG. 19 depicts a method for estimating blue re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments.

FIG. 19 depicts a method for estimating blue re-sample data separately at each site assuming only vertical edges, horizontal edges, vertical stripes and horizontal stripes, along with the calculated contributions of each to the final red, green and blue values for use in a camera for use in a portable multifunction device in accordance with some embodiments. A Blue sample matrix of size m×n is calculated (block 1900). Re-sampling and interpolation assuming only vertical edges is performed. Bve size 2m×2n (block 1902). Re-sampling and interpolation are performed, assuming only horizontal edges. Bhe size 2m×2n (block 1904). Re-sampling and interpolation are performed assuming only vertical stripes. Bvs size 2m×2n (block 1906). Re-sampling and interpolation are performed assuming only horizontal stripes. Bhs size 2m×2n (block 1908). Contribution of vertical edges is calculated based on normalized relative strength. CBve size 2m×2n (block 1910). Contribution of horizontal edges is calculated based on normalized relative strength. CBhe size 2m×2n (block 1912). Contribution of vertical stripes is calculated based on normalized relative strength. CBvs size 2m×2n (block 1916). Contribution of horizontal stripes is calculated based on normalized relative strength. CBhs size 2m×2n (block 1918).

Figure 20:
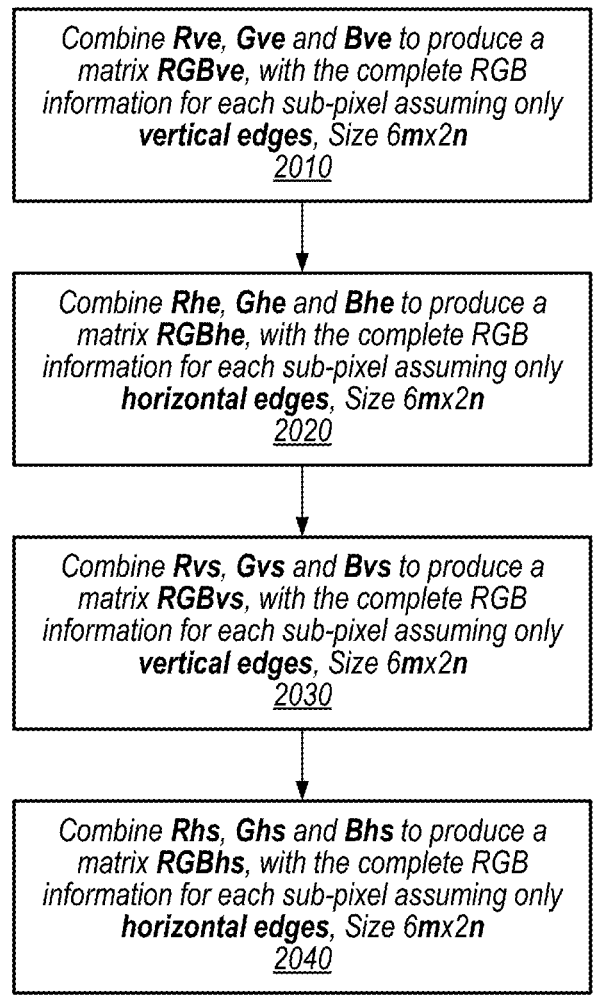
FIG. 20 illustrates a method for combining red, green and blue channel data into four larger matrices, one for each possible influence of horizontal edges, vertical edges, horizontal stripes and vertical stripes for use in a camera for use in a portable multifunction device in accordance with some embodiments.

FIG. 20 illustrates a method for combining red, green and blue channel data into four larger matrices, one for each possible influence of horizontal edges, vertical edges, horizontal stripes and vertical stripes for use in a camera for use in a portable multifunction device in accordance with some embodiments. Rve, Gve and Bve are combined to produce a matrix RGBve, with the complete RGB information for each sub-pixel assuming only vertical edges. Size 6m×2n (block 2010). Rhe, Ghe and Bhe are combined to produce a matrix RGBhe, with the complete RGB information for each sub-pixel assuming only horizontal edges. Size 6m×2n (block 2020). Rvs, Gvs and Bvs are combined to produce a matrix RGBvs, with the complete RGB information for each sub-pixel assuming only vertical stripes. Size 6m×2n (block 2030). Rhs, Ghs and Bhs are combined to produce a matrix RGBhs, with the complete RGB information for each sub-pixel assuming only horizontal stripes. Size 6 m×2n (block 2040).

Figure 21:
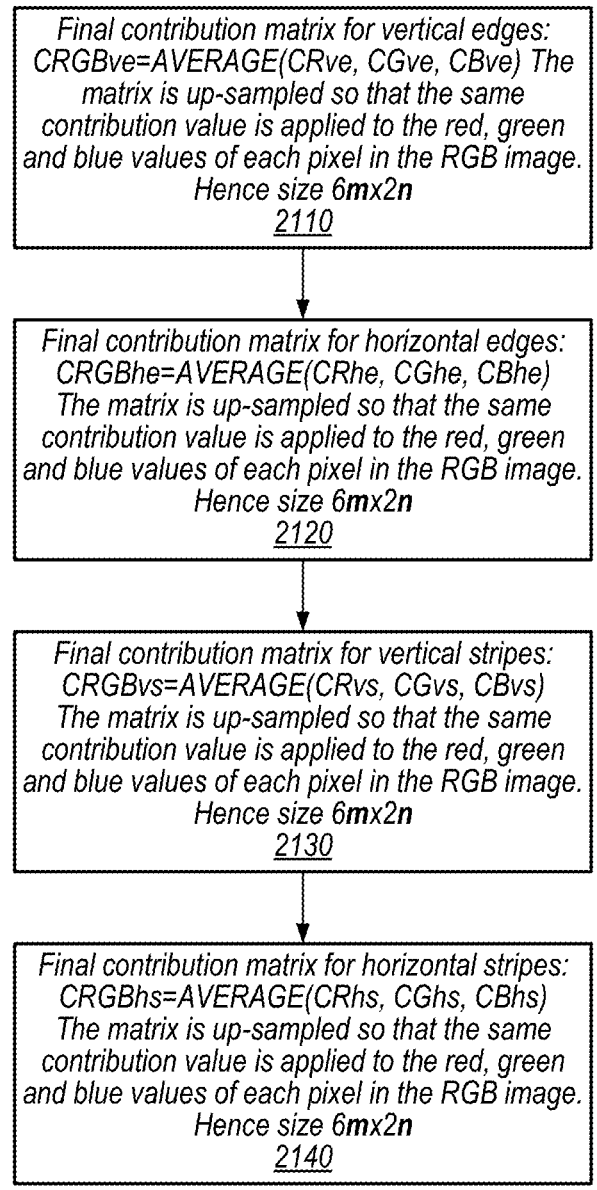
FIG. 21 depicts a method for generating four combined 'contribution matrices' for how each of the vertical edges, horizontal edges, vertical stripes and horizontal stripes influences the final image for use in a camera for use in a portable multifunction device in accordance with some embodiments.

FIG. 21 depicts a method for generating four combined 'contribution matrices' for how each of the vertical edges, horizontal edges, vertical stripes and horizontal stripes influences the final image for use in a camera for use in a portable multifunction device in accordance with some embodiments. A final contribution matrix is calculated for vertical edges:CRGBve=AVERAGE(CRve, CGve, CBve). The matrix is up-sampled so that the same contribution value is applied to the red, green and blue values of each pixel in the RGB image. Hence size 6 m×2n (block 2110). A final contribution matrix is calculated for horizontal edges: CRGBhe=AVERAGE(CRhe, CGhe, CBhe). The matrix is up-sampled so that the same contribution value is applied to the red, green and blue values of each pixel in the RGB image. Hence size 6 m×2n (block 2120).

A final contribution matrix is calculated for vertical stripes: CRGBvs=AVERAGE(CRvs, CGvs, CBvs). The matrix is up-sampled so that the same contribution value is applied to the red, green and blue values of each pixel in the RGBimage. Hence size 6 m×2n (block 2130). A final contribution matrix is calculated for horizontal stripes: CRGBhs=AVERAGE(CRhs, CGhs, CBhs). The matrix is up-sampled so that the same contribution value is applied to the red, green and blue values of each pixel in the RGB image. Hence size 6m×2n(block 2140).

FIG. 22 illustrates computations related to an RGB image with combined information from vertical edges, horizontal edges, vertical stripes and horizontal stripes for use in a camera for use in a portable multifunction device in accordance with some embodiments. An unfiltered combined RGB image RGBunfil 2210 of size 6 m×2n can be expressed as the sum of the product of pixel by pixel multiplication of RGBve 2220 and CRGBve 2280 with the product of pixel by pixel multiplication of RGBhe 2240 and CRGBhe 2230, the product of pixel by pixel multiplication of RGBvs 2260 and CRGBvs 2250, the product of pixel by pixel multiplication of RGBhs 2280 and CRGBhs 2270.

FIG. 22 illustrates shows how the information using the different re-sampling methods and the different contributions, are combined into a single RGB image.

This 6m×2n sized matrix (called RGBunfil in FIG. 22) represents a 'beachhead' in the calculation. Whilst not the final image, the calculations and manipulations that follow are performed starting from this matrix. Matrices earlier in the calculation are not used. This matrix encapsulates all the information from the three channels, and how the calculations so far have made best use of it.

It is useful to explore some example results of the calculations so far. FIGS. 27 to 30 give some results when looking at different idealized targets.

Figure 23:
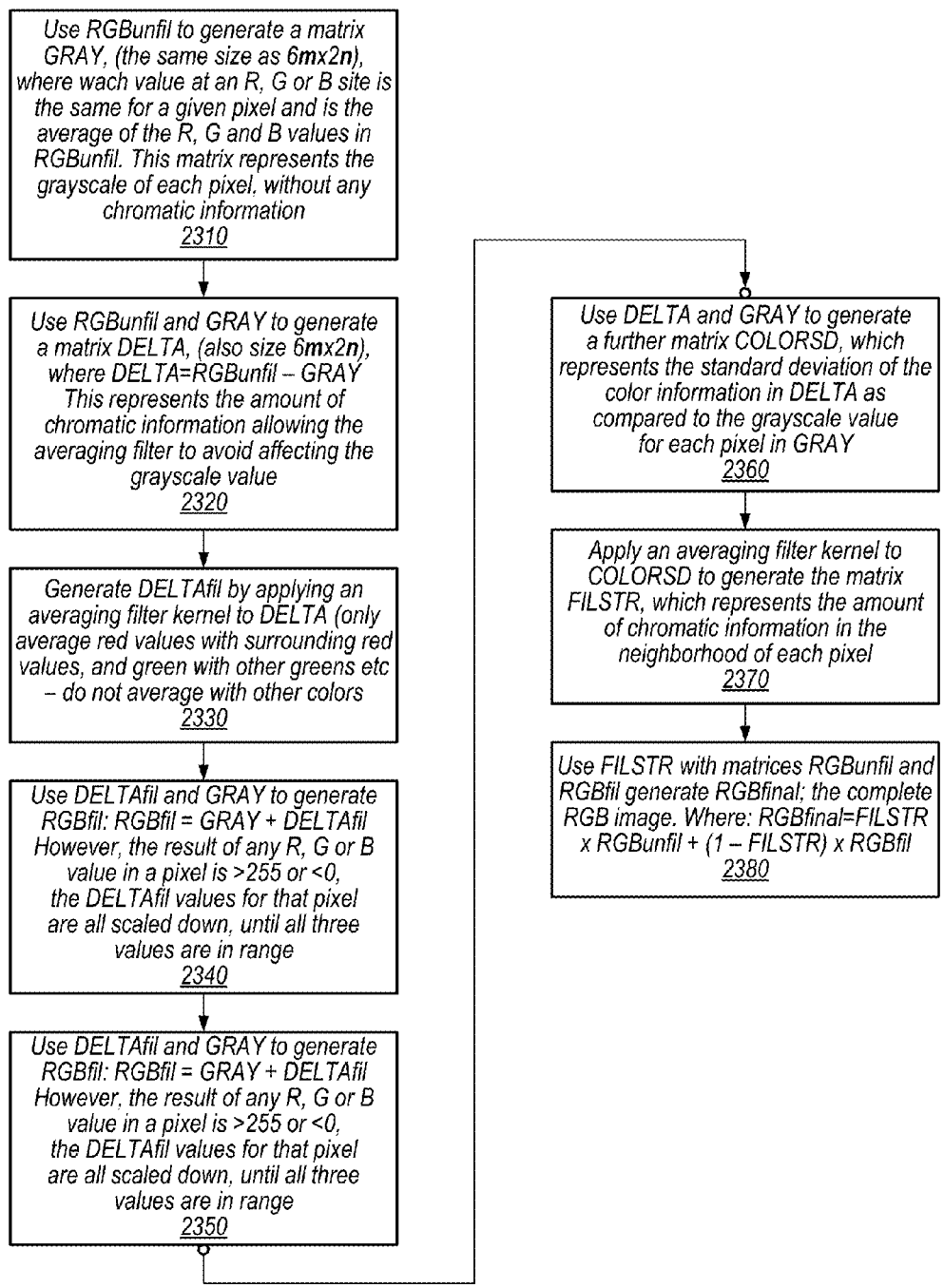
FIG. 23 depicts process stages to optimize chromatic information for use in a camera for use in a portable multifunction device in accordance with some embodiments.

FIG. 23 depicts process stages to optimize chromatic information for use in a camera for use in a portable multifunction device in accordance with some embodiments. FIG. 23 details how the matrices RGBunfil and GRAY are manipulated to form the matrix RGFfil, which has essentially had an averaging kernel applied to to the chromatic information of each pixel, whilst leaving the grayscale information un-averaged. As can be seen, this process has removed most of the undesirable color artifacts, leaving an image similar GRAY.

It is somewhat unsurprising to one of skill in the art in light of having read the present disclosure that in the case of a black and white target, a manipulation to the RGBunfil information that generally smooths out the color information produces a more accurate result. It should also be noted that looking at the red, green and blue information on their own (as illustrated in the twelve color channel estimation matrices shown), no one matrix is adequately able to reconstruct the slanted edges of the target; the light and dark regions in these images are in 'clumps'. However, since the red, green and blue channels are have sampled the target at different positions, the three channels in combination reveal the underlying stripes. This demonstrates that this algorithm is genuinely achieving a pleasing degree of super-resolution.

RGBunfil is used to generate a matrix GRAY, (the same size as 6m×2n), where each value at an R, G or B site is the same for a given pixel and is the average of the R, G and B values in RGBunfil. This matrix represents the grayscale of each pixel, without any chromatic information (block 2310).

RGBunfil and GRAY are used to generate a matrix DELTA, (also size 6m×2n), where DELTA=RGBunfil−GRAY. This represents the amount of chromatic information allowing the averaging filter to avoid affecting the grayscale value (block 2320). DELTAfil is generated by applying an averaging filter kernel to DELTA (only average red values with surrounding red values, and green with other greens etc—do not average with other colors) (block 2330).

DELTAfil and GRAY are used to generate RGBfil: RGBfil=GRAY+DELTAfil. However, if the result of any R, G or B value in a pixel is >255 or <0, the DELTAfil values for that pixel are all scaled down, until all three values are in range (block 2340). DELTAfil and GRAY to generate RGBfil: RGBfil=GRAY+DELTAfil. However, if the result of any R, G or B value in a pixel is >255 or <0, the DELTAfil values for that pixel are all scaled down, until all three values are in range (block 2350).

DELTA and GRAY are used to generate a further matrix COLORSD, which represents the standard deviation of the color information in DELTA as compared to the grayscale value for each pixel in GRAY (block 2360). An averaging filter kernel is applied to COLORSD to generate the matrix FILSTR, which represents the amount of chromatic information in the neighborhood of each pixel (block 2370). FILSTR is used with matrices RGBunfil and RGBfil to generate RGBfinal, the complete RGB image. Where: RGBfinal=FILSTR×RGBunfil+(1−FILSTR)×RGBfil (block 2380).

Figures 24A, 24B:
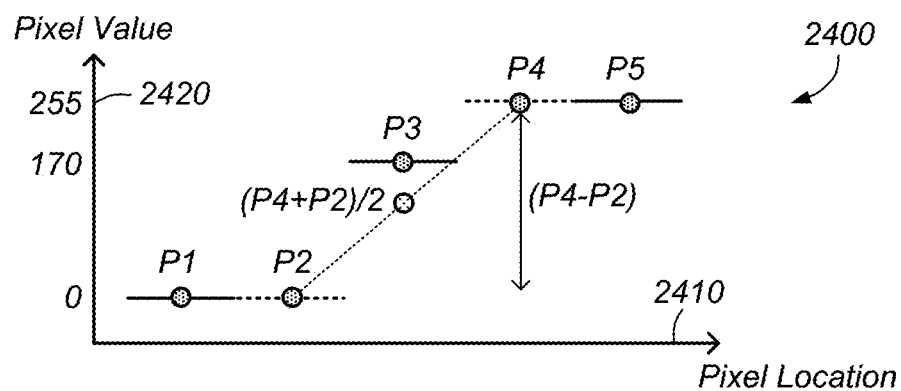
FIG. 24A is a graph that illustrates edge position calculation for use in a camera for use in a portable multifunction device in accordance with some embodiments.
FIG. 24B is a chart that illustrates edge position calculation for use in a camera for use in a portable multifunction device in accordance with some embodiments.

FIG. 24A is a graph that illustrates edge position calculation for use in a camera for use in a portable multifunction device in accordance with some embodiments. Graph 2400 shows a pixel value and pixel location 2410 for each of several values.

FIG. 24B is a chart that illustrates edge position calculation for use in a camera for use in a portable multifunction device in accordance with some embodiments. For each labeled pixel 2430, a pixel value is 2440 is provided, as well as an edge position 2450.

FIGS. 24A-24B help illustrate an algorithm used by some embodiments. As an example, consider the case of five pixels in a row in the red array. These sampled pixels have the values shown in FIG. 24A: 0, 0, 170, 255, and 255. For convenience, these pixels are named P1 to P5. The schematic graph helps illustrate these value. It may be intuitively appreciated by one of skill in the art in light of having read the present disclosure that one interpretation of these data is that there is a sharp edge somewhere in the middle of P3. On this assumption, there are actually only two correct values in the row: 0 and 255. However since P3 spans the edge, it have a value between these two, based on the weighted sum of 0 and 255 based on the position of the edge in P3.

Given this basic assumption of a horizontal edge, it is possible to analytically determine where such an edge would be located inside P3. Knowing this edge position is very helpful for later re-sampling at a higher resolution: the value of the sub-pixel can be estimated based on the location of the edge and the surrounding pixel values.

The location of the can be estimated using the equation: Edge position inside P3=E3=−(P3−{P2+P4}/2)/[P4−P2]).

This equation is essentially estimating the edge position as the difference between P3 and the average of P2 and P4, as a fraction of the difference between P2 and P4. This results in the edge position being expressed as a fraction of the pixel width.

By considering different scenarios, it may be appreciated by one of skill in the art in light of having read the present disclosure if E3=0, this corresponds to the case where P2 is equidistant between P2 and P4. Hence, if E3=0, this implies the sharp edge is in the middle of the pixel.

On the other hand, if P3=P4, this means E3=−0.5, since the difference between P3 and the average of P2 and P4 is half the difference between P2 and P4. The minus sign, ensures the interpretation that the edge is located half a pixel away from the center towards the left. Hence, with a value of E3=−0.5, there is no edge within the pixel, but there is expected to be an edge to the left of the pixel.

This calculation may be repeated for all pixels.

FIGS. 24A-24B give the edge position values for each pixel P1 to P5. Note that for the pixel values shown the edge position equation predicts the edge is located −⅙ of a pixel away from the centerline. It may intuitively be appreciated, by one of skill in the art in light of having read the present disclosure, that the with the edge in this position, the left hand third of P3 would take on the value of P2, whilst the right hand two thirds of a pixel would take on the value of P4. In this way, the actual sampled value would be ⅔ of 255, which is 170 as shown. Hence this calculation is consistent with what we would expect in light of having read the present disclosure.

With this assumption about the underlying higher resolution image data, the edge position, and the values of P2 and P4 either side of the pixel in question, P3, it is possible to use this information to estimate the value of a sub-pixel that overlaps with all or part of P3.

Figure 25:
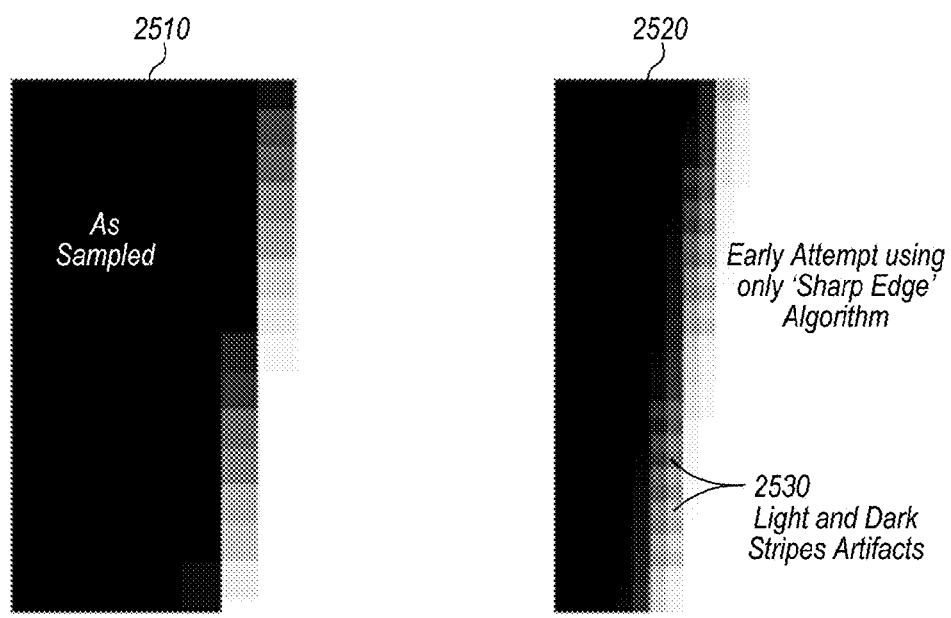
FIG. 25 depicts an effect of a sharp edge algorithm on soft edges.

FIG. 25 depicts an effect of a sharp edge algorithm on soft edges. Values as sampled 2510 are shown, as are an early attempt using only a sharp edge algorithm 2520 with light and dark artifacts. As will be readily appreciated by one of skill in the art in light of having read the present disclosure, FIG. 25 shows that an assumption of sharp edges is not the only possibility and can lead to image artifacts if such sharp edges do not intact exist.

As can be seen in the case of a slanted edge, the data as samples changes gradually vertically, so that in this case, the assumption of sharp horizontal edges is not valid, here are alternate light and dark sub-pixel stripes generated as an artifact of the sharp edge assumption.

However, in some embodiments it is possible to further use the edge position calculation to provide a 'sharp edge contribution' parameter at each sub-pixel. In so doing, the final estimated values assuming a edge is the weighted sum between the 'sharp edge' calculation and a soft edge calculation. In some embodiments, the soft edge calculation is simply either the 'nearest neighbor' value, if the sub-pixel is entirely inside a sampled pixel, or is a linear sum of two neighboring pixels, if the sub-pixel spans two pixels.

The 'sharp edge contribution parameter' is determined by looking as the edge positions in the two neighboring pixels. Looking again at the edge positions in P1 to P5 as shown in FIG. 24A-24B, considering the sharp edge contribution at P3, one of skill in the art can see in light of having read the present disclosure that P2 is predicting an edge to the right of P2 and P4 is predicting an edge to the left of P4. It may be intuitively appreciated by one of skill in the art in light of having read the present disclosure that these data provide a strong case for assuming a strong edge within P3.

Putting this mathematically, the 'sharp edge contribution' at P3 (called SH3) is defined as:
IND2: IF E2<0 THEN IND2=0 ELSE IND2=E2/0.5
IND4: IF E4>0 THEN IND4=0 ELSE IND4=−E4/0.5
SH3=MAXIMUM of IND2 and IND4

As can be seen by one of skill in the art in light of having read the present disclosure, SH3 can take values between 0 and 1. A value of 1 indicates that the surrounding pixels expect a sharp edge within P3. A value of 0 implies that the surrounding pixels are expecting a soft edge (gradual change) across P2, P3 and P4 On this basis, the estimated red pixel value assuming vertical edges is: Rve=(1−SHE3)× (soft edge linear interpolation or nearest neighbor)+ (SHE3)×(Sharp edge estimate).

Note in this case, Rve is the individual sub-pixel value, not a matrix as illustrated in FIGS. 17-19. This calculation is repeated on a per sub-pixel basis to generate the matrix Rve. Considering in more detail the 'sharp edge estimate', one of skill in the art in light of having read the present disclosure will appreciate the five pixels P1 to P5 shown in FIG. 24A and may also envision a sub-pixel wholly within P3. One of skill in the art in light of having read the present disclosure may estimate the value of this sub-pixel based on an assumption of a sharp vertical edge within P3.

Assuming the center of the considered sub-pixel within P3, which may be called SUB3, is offset from the center of P3 by a distance δ3 to the right, where the units of delta 3 are 'pixel widths'. Hence if the center of the sub-pixel were on the edge between P3 and P4, δ3 would be +0.5, and if SUB3 is centered at the center of P3, δ3 would be 0. The width of the sub-pixel is half the width of P3. Hence, to be wholly inside P3 for this example, δ3 is expected to be in the range −0.25<δ3<0.25.

In some embodiments, the resampling process is as follows:
Calculate E-SUB3, the edge position of the edge within P3 as referred to the center position of SUB3: ESUB3=E3−δ3

Now there are five options for the value of SUB3:

| IF | ESUB3 ≥ 0.25 & E3 ≥ 0.5 | THEN | SUB3 = P3 |
|---|---|---|---|
| ELSE IF | ESUB3 ≥ 0.25 & E3 < 0.5 | THEN | SUB3 = P2 |
| ELSE IF | ESUB3 ≤ −0.25 & E3 ≤ −0.5 | THEN | SUB3 = P3 |
| ELSE IF | ESUB3 ≤ −0.25 & E3 > −0.5 | THEN | SUB3 = P4 |
| ELSE | SUB3 = {(0.25 + ESUB3) * P2 + (0.25 − ESUB3) * P4} * 2 | | |

(Note that the conditions in the first and third options could just be 'E3≥0.5' and 'E3≤−0.5' respectively, but the extra conditions with ESUB3, makes the case more explicit). Of the five options, to relate to the cases where there is not strong edge within P3. This is when E3≥0.5 or E3≤−0.5. In these cases, since there is no strong edge within the pixel, then SUB3=P3; the value of the pixel.

The second option is where the edge position is within P3, but is outside (and to the right of) SUB3. In this case, SUB3 takes on the value of P2; the pixel to the left of P3. The fourth option is where the edge position is within P3, but is outside (and to the left of) SUB3. In this case, SUB3 takes on the value of P4; the pixel to the right of P3.

Finally, if none of the other conditions are true, this implies the edge position is within SUB3. In this case the value of SUB3 is the weighted sum of the left hand pixel (P2) and the right hand pixel (P4), the weighting being based on the position of the edge within SUB3.

Consider the case where a sub-pixel spans to pixels. Given the previous discussion, we might consider the value of SUB4, which is the next sub-pixel to the right of SUB3. Given the previous assumption that SUB3 is wholly within P3, then we can assume that SUB4 is partially within P3 and partially within P4. The task now is to calculate the value of SUB4 based on the sharp edge assumption. In order to evaluate SUB4, it is necessary to split the calculation into two pieces: one for the portion of SUB4 within P3 (SUB4_3), and one for the portion of SUB4 within P4 (SUB4_4). Firstly consider the portion of SUB4 within P3 (SUB4_3). For this case, the right hand edge of this portion coincides with the right hand edge of P3. Relative to the center of P3, the center of SUB4 is offset by δ4_3, where δ4_3=δ3+0.5, since the pitch between sub-pixels is 0.5 of the sampled pixels.

The edge location of the edge in P3 relative to the center of SUB4 is: ESUB4_3=E3−δ4_3. In this case, there are only four options, since there is no possibility of E3 being located within P3, but to the right of SUB4_3, since the limit of the portion of SUB4_3 is also the limit of P3. Hence the value of SUB4_3 is:

| IF | E3 ≥ 0.5 | THEN | SUB4_3 = P3 |
|---|---|---|---|
| ELSE IF | E3 ≤ −0.5 | THEN | SUB4_3 = P3 |
| ELSE IF | ESUB4_3 ≤ −0.25 & E3 > −0.5 | THEN | SUB4_3 = P4 |
| ELSE | SUB4_3 = {(0.25 + ESUB4_3) * P2 + (0.5 − δ4_3 − ESUB4_3) * P4}/(0.75 − δ4_3) | | |

In the fourth option, (0.75−δ4_3) represents the width of SUB4_3 as a fraction of one pixel. Hence the factor 1/(0.75−δ4_3) normalizes the value given to SUB4_3. This is equivalent to the factor of 2 in the calculation of SUB3, but now SUB4_3 is smaller than half a pixel wide. Similarly, considering the portion of SUB4 within P4 (SUB4_4), the center of SUB4 relative to the center of P4 is δ4_4.

Likewise the location of the edge calculated for P4, relative to the center of SUB4 is: ESUB4_4=E4−δ4_4 There are also four options for the value of SUB4_4:

|  | E4 ≥ 0.5 | THEN | SUB4_4 = P4 |
|---|---|---|---|
| ELSE IF | E4 ≤ −0.5 | THEN | SUB4_4 = P4 |
| ELSE IF | ESUB4_4 ≥ 0.25 & E3 < 0.5 | THEN | SUB4_4 = P3 |
| ELSE | SUB4_4 = {(0.5 + δ4_3 + ESUB4_4) * P3 + (0.25− ESUB4_4) * P5}/(0.75 + δ4_4) | | |

With values for SUB4_3 and SUB4_4, some embodiments combine these values with a weighted sum according to the widths of these two portions to derive the final value for SUB4: SUB4={(0.75−δ4_3)*SUB4_3+(0.75+δ4_4)*SUB4_4}/0.5.

The calculations of far for SUB3 and SUB4 can be continued for each sub-pixel in a row of sampled pixels, and it is assumed that each of these sub-pixels is wholly located vertically within the row of sample pixels. When moving to the next row of sample pixels, the exercise can be repeated to generate the sub-pixels. However, because super-sampling by ×2 both horizontally and vertically there is an additional row of sub-pixels between these calculated rows. Depending on the positions of the sampling sites, it is likely for the red and blue channels that these interpolated rows of sub-pixels span at least two rows of samples pixels.

In some embodiments, this is resolved by determining for each interpolated sub-pixel the portion that is in one row of sampled pixels and the portion that is in the other. Then a further weight sum calculation, similar to the one for SUB4 above is used to evaluate the values of these interpolated rows. For the green channel this is not necessary as the pixel sites are chosen to sub-divide the sampled pixels. Hence for the green channel, again considering the calculation for vertical edges, the calculations described above representing SUB 3 and SUB4 are the same for sequential rows inside a given row of sampled pixels.

Hence for each channel with the sample matrix of size m by n, these vertical edge calculations can be used to derive a super-resolved and re-sampled matrix of size 2m by 2n, in which the basic assumption of the resampling is that differences between sampled pixels are caused only by vertical edges in the target image.

Separate to these estimated re-sampling values, it is necessary to calculate the 'strength' of the vertical edge within each sub-pixel channel. Hence, again for each channel, we need to derive matrices of size 2m by 2n that represent the edge strength at each sub-pixel.

As illustrated in FIGS. 17-19 these 'strength' matrices are used in conjunction with other strength matrices associated with horizontal edges, vertical stripes and horizontal stripes to determine the contribution of the 'vertical edge' matrices to the final image. So for example, if the calculated 'strength' of the vertical edge at a given sub-pixel is higher than the calculated strengths of the horizontal edge, vertical stripe and horizontal stripe at the same sub-pixel, then the pixel value in the vertical edge matrix will be weighted more highly in the final image derived by combining the different effects together.

For the case of vertical edges, the 'strength' of the vertical edge within each sampled pixel is represented by the difference in values of the pixels either side. So, for example, considering the pixels and pixel values in FIG. 9: The strength of the edge at P3=(P4−P2). Hence, since P2=0, and P4=255, the strength of the edge at P3=255, which is the maximum possible value. These strength calculations derive matrices of size m×n for each channel. Derivation of the contribution matrices is discussed below after discussing the calculations for stripes.

It may be understood by one of skill in the art in light of having read the present disclosure that whilst the previous discussion considered the calculations assuming vertical edges, it is easy for one of skill in the art in light of having read the present disclosure to extrapolate and use equivalent calculations to derive matrices for each channel assuming only horizontal edges in the target image.

Figures 26A, 26B:
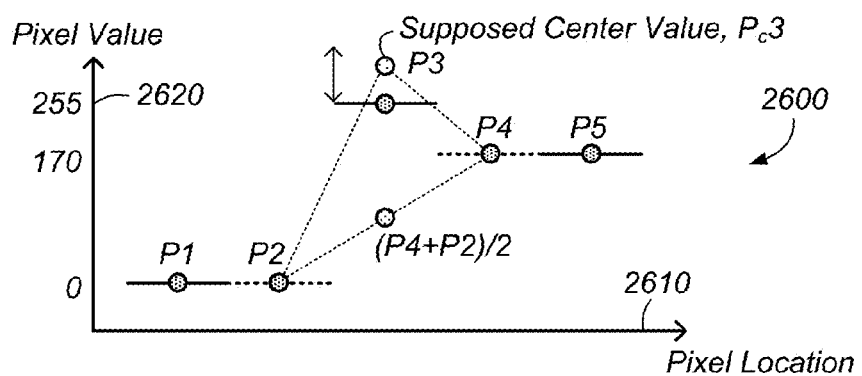
FIG. 26A illustrates with a graph stripe calculation and pixel center value for use in a camera for use in a portable multifunction device in accordance with some embodiments.
FIG. 26B illustrates with a chart stripe calculation and pixel center value for use in a camera for use in a portable multifunction device in accordance with some embodiments.

Turning now to discuss the calculation estimating the sub-pixel values based on the assumption of only vertical stripes in the target image, FIG. 26A illustrates with a graph stripe calculation and pixel center value for use in a camera for use in a portable multifunction device in accordance with some embodiments. For each of five sample pixels, chart 2600 shows a pixel value 2620 at a pixel location. FIG. 26B illustrates with a chart stripe calculation and pixel center value for use in a camera for use in a portable multifunction device in accordance with some embodiments. For each of five pixels 2630, a pixel value is included.

Consider five sample pixels in a given row of the red channel, the values based on capturing a target image. Some embodiments build on the assumption that each sample pixel is actually imaging a stripe with a triangular intensity profile. This means that the light intensity across the sampled pixel can be described by three values: one at the left hand edge of the pixel; one in the middle; and one at the right hand end. The actual measured sample value is then the integration of the light intensity across the width of the pixel.

Assuming this model is valid, some embodiments use the sample value at the pixel in question, along with the sample values of the pixels either side to derive these three light intensity values. Some embodiments concentrate on calculating the light intensity at the center of the pixel, since the intensities at the edges are easy to derive from this.

Hence, as shown in FIG. 26A for the pixel P3, the aim is to calculate the intensity of the light at the center of the pixel based on the values of P2, P3 and P4. This is an analytical result. The value at the center of the pixel (Pc3) is: Pc3=P3+(P3−{P4+P2}/2)/3.

From this value it is straightforward to one of skill in the art in light of having read the present disclosure to derive the values at the edges of the pixel, so these do not need to be stored separately. The value at the left hand edge is Pl3=(Pc3+P2)/2. The value at the right hand edge is Pr3=(Pc3+P4)/2. The values of Pc3, Pl3 and Pr3 can now be used to re-sample the value of a sub-pixel (or a portion of a sub-pixel) that overlaps with P3.

As before, consider a sub-pixel SUB3, wholly inside P3. The re-sampling calculation needs to be split in four calculation: based on each edge of the sub-pixel, and whether these edges are to the left or right of the center of P3, since the model is non linear about the center of the pixel. For this calculation, represent the position of the right hand edge of SUB3 as δ3r relative to the center of P3 in units of 'pixel widths', and the position of the left hand edge of SUB3 as δ3r, also relative to the center of P3. Hence both δ3r and δ3l must be in the range −0.5 to +0.5. Hence the value of SUB3 is:

| SUB3 = | [{IF | δ3r ≥ 0 | THEN | δ3r * (Pr3 * δ3r + Pc3 * (1 − δ3r))} + |
|---|---|---|---|---|

| | | | |
|---|---|---|---|
| {IF | $\delta 3l \geq 0$ | THEN | $-\delta 3l * (Pr3 * \delta 3l + Pc3 * (1 - \delta 3l))$} + |
| {IF | $\delta 3l < 0$ | THEN | $-\delta 3l * (-Pl3 * \delta 3l + Pc3 * (1 + \delta 3l))$} + |
| {IF | $\delta 3r < 0$ | THEN | $\delta 3r * (-Pl3 * \delta 3r + Pc3 * (1 + \delta 3r))$}]/($\delta 3r - \delta 3l$) |

As with the vertical edge calculation, we will now consider the next sub-pixel to the right; SUB4. As before, the assumption is that this pixel is partially within P3 and partially within P4. As such, the re-sampling calculation needs to be split in two. The portion of SUB4 in P3 is SUB4_3, and the portion in P4 is SUB_4_4. For SUB4_3, the left hand edge is $\delta 4l$, the right hand edge is 0.5, both relative to the center of P3. For SUB4_4, the left hand edge is −0.5, and the right hand edge is $\delta 4r$, both relative to the center of P4. SUB4_3=[0.5*(Pr3*0.5+Pc3*0.5)−$\delta 4l$*(Pr3*$\delta 4l$+Pc3*(1−$\delta 4l$))]/(0.5−$\delta 3l$). Given that SUB4 is partially within P3 and P4, there is no need for the IF statements. Likewise for SUB4_4: SUB4_4=[0.5*(Pl4*0.5+Pc4*0.5)+$\delta 4r$*(−Pl4*$\delta 4r$+Pc4*(1+$\delta 4r$))]/($\delta 4r$+0.5). Hence SUB4={($\delta 4r$+0.5)*SUB4_4+(0.5−$\delta 3l$)*SUB4_3}*2 (A weighted sum of SUB4_3 and SUB4_4 according to the widths of these two portions).

Based on these calculations, rows of sub-pixels wholly within the rows of sampled pixels can be calculated. However, since the there are also twice as many rows of sub-pixels, rows of sub-pixels in between have portions within two rows of sampled pixels. The values of sub-pixels in these rows are interpolated as a weighted sum of the rows above and beneath, based on the portion of the sub-pixel rows in the two sampled rows.

Hence, as with the edge calculations, for each channel with the sample matrix of size m by n, these vertical stripe calculations can be used to derive a super-resolved and re-sampled matrix of size 2m by 2n, in which the basic assumption of the resampling is that differences between sampled pixels are caused only by vertical stripes in the target image. In addition, the 'strength' of the vertical stripes in each 'sampled' pixel can be calculated as: 'Strength' of vertical stripe at P3=Pc3−P3.

These strength calculations derive matrices of size m×n for each channel. It may be appreciated by one of ordinary skill in the art in light of having read the present disclosure that similar calculations can be used to calculate the sub-pixel re-sampling, and strength matrices based on the assumption of horizontal stripes.

To summarize, based on the calculations discussed, from the three color channel sample array matrices of size m×n, embodiments deploy the following matrices:

Three super-sampled matrices of size 2m×2n, assuming vertical edges for the three color channels; red, green and blue Three super-sampled matrices of size 2m×2n, assuming horizontal edges for the three color channels; red, green and blue Three super-sampled matrices of size 2m×2n, assuming vertical stripes for the three color channels; red, green and blue Three super-sampled matrices of size 2m×2n, assuming horizontal stripes for the three color channels; red, green and blue Three vertical edge 'strength' matrices of size m×n, for the three color channels; red, green and blue Three horizontal edge 'strength' matrices of size m×n, for the three color channels; red, green and blue Three vertical stripe 'strength' matrices of size m×n, for the three color channels; red, green and blue Three horizontal stripe 'strength' matrices of size m×n, for the three color channels; red, green and blue At this stage, no information from the different color channels has been combined, except that the green channel was used to define the positions of the sub-sampled pixel sites, and these were mapped onto the red and blue channels to provide the sites for sub-pixel re-sampling.

Considering the red channel, the four strength matrices can be used to derive four 'contribution' matrices. For each sample pixel (say P3), there is a 'strength' value for each of the four assumed models:

Strength of vertical edge at P3=Sve3
Strength of horizontal edge at P3=She3
Strength of vertical stripe at P3=Svs3
Strength of horizontal stripe at P3=Shs3

Deriving Contributions:

Contribution of vertical edge at P3 (Cve3)=(Sve3)/(Sve3+She3+Svs3+Shs3)
Contribution of horizontal edge at P3 (Che3)=(She3)/(Sve3+She3+Svs3+Shs3)
Contribution of vertical stripe at P3 (Cvs3)=(Svs3)/(Sve3+She3+Svs3+Shs3)
Contribution of horizontal stripe at P3 (Chs3)=(Shs3)/(Sve3+She3+Svs3+Shs3)

Such contribution matrices can be derived for each channel.

Note that these contribution values are correctly normalized, such that: Cve3+Che3+Cvs3+Chs3=1. Each contribution matrix in each channel is then up-sampled to size 2m×2n by linear interpolation, based on the locations of the sub-pixels. The state of these matrices is now equivalent to what is shown in FIGS. 17-19.

As illustrated in FIG. 20, the contribution matrices for each channel are combined by simple averaging, so that for example, there is now a single 6m×2n matrix that represents the contribution of vertical edges. Note that whilst the matrix has been increased in size to 6m×2n so as to act on each red, green and blue value in each sub-pixel of a combined RGB matrix, the actual contribution values of the red, green, and blue channels in the RGB matrix are identical, so there is actually only 2m×2n of actual information.

In addition, the three 2m×2n channel specific matrices for (for example vertical edges) are combined together into a 6m×2n RGB matrix (RGBve). Note that the information from the three channels is not averaged or filtered in any way at this stage. This is just a method to tabulate the RGB values for each sub-pixel. This process of tabulating the channel information together, so that data can be interpreted as RGB values for each sub-pixel, is repeated for separate RGB matrices cataloging the resampling due to horizontal edges, vertical stripes and horizontal stripes.

Figure 27:
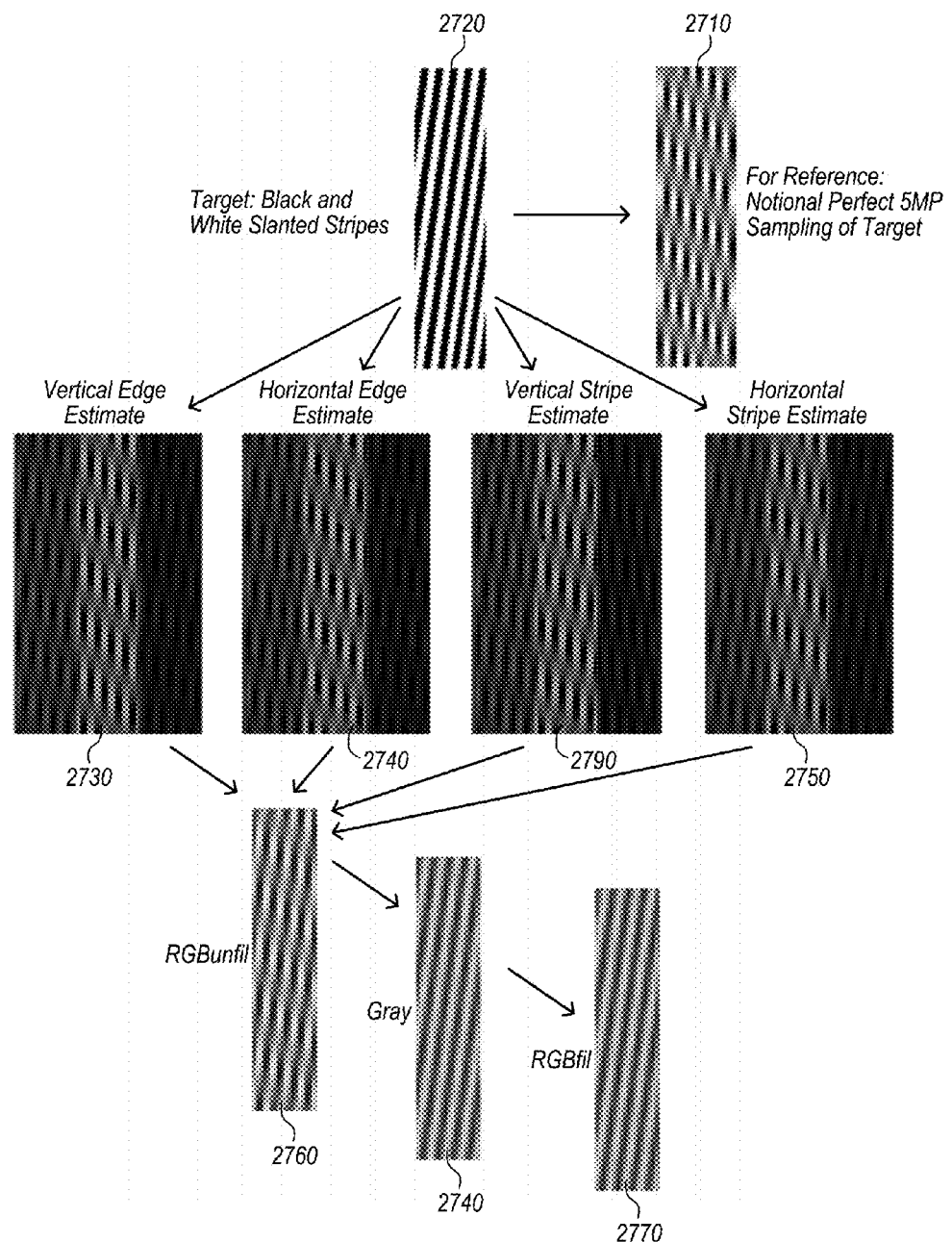
FIG. 27 illustrates results for a high spatial frequency black and white slanted stripe target for use in a camera for use in a portable multifunction device in accordance with some embodiments.

FIG. 27 illustrates results for a high spatial frequency black and white slanted stripe target for use in a camera for use in a portable multifunction device in accordance with some embodiments. For reference, a notional 5 perfect 5MP sampling of a target 2710 is show. A target of black and white stripes 2620 is shown. A vertical edge estimate 2730 is shown. A horizontal edge estimate 2740 is shown. A vertical stripe estimate 2790 is shown. A horizontal stripe estimate 2750 is shown. RGBunfil 2760 is shown. Gray 2780 is shown. RGBfil 2770 is shown. In FIG. 27, the target 2760 is a black and white target of closely spaced slanted stripes. For reference an image of an ideal black and white sampling of this target using the pixel pitch of the 5MP sensors 2710 is considered for a preferred architecture.

In this ideal sampled image, it is just possible to discern that the target stripes generally go from bottom left to top right. However, there are significant contrary gray stripes as a result of aliasing, since the pixel pitch is not sufficient adequately pick out these stripes.

In FIG. 27, below the target are presented the twelve matrices re-sampling that captured samples (four for each color channel) based on the different assumptions about the underlying causes of the sampled data. For this image, it may be generally appreciated that the contribution from the 'vertical stripes' matrices dominate, although the contribution matrices are not reproduced here.

FIG. 27 shows that these twelve matrices, in combination with the four contribution matrices are used to derive the RGBunfil matrix shown.

It can be seen that the RGBunfil matrix has significant color artifacts. However, when this RGBunfil matrix is manipulated to extract the 'channel average' of each pixel, which represents the grayscale information in the image (and is shown as the matrix GRAY in FIG. 12), the stripes are successfully reconstructed.

Figure 28:
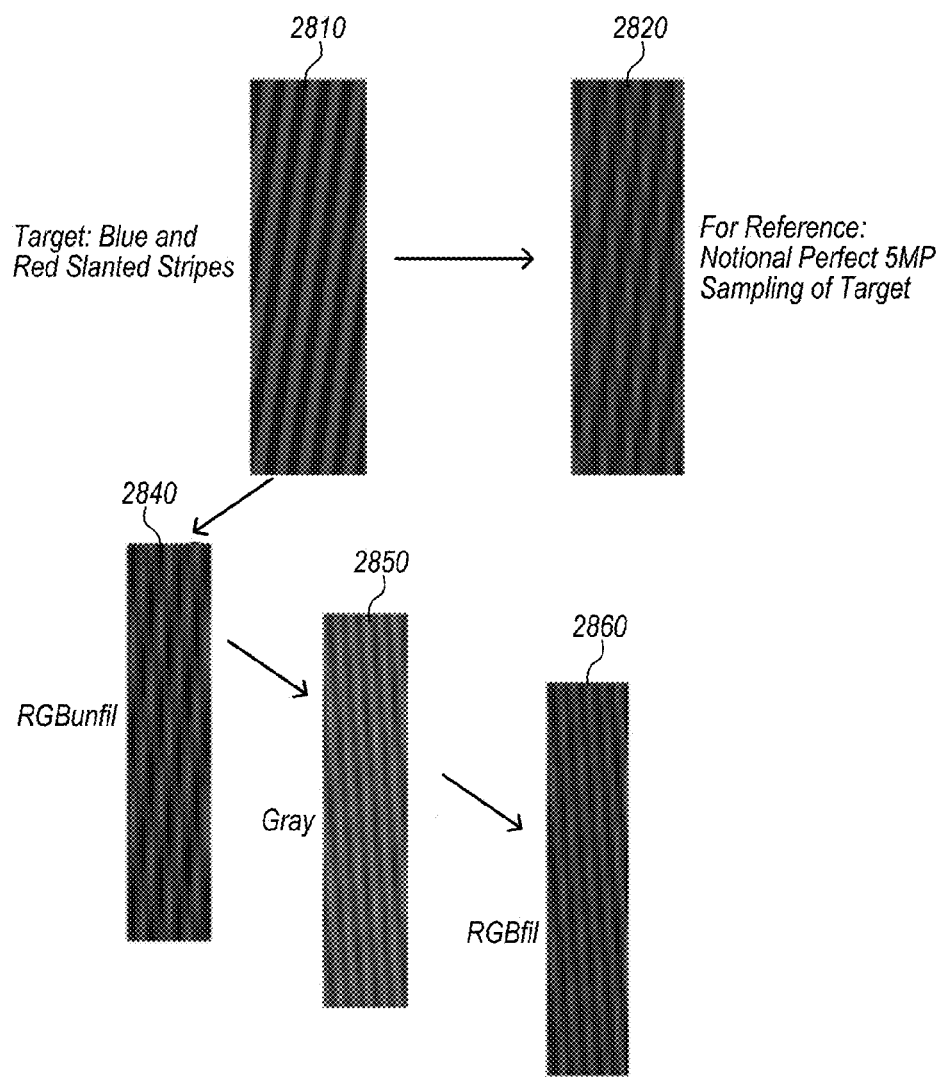
FIG. 28 depicts results for a high spatial frequency slanted stripe target for use in a camera for use in a portable multifunction device in accordance with some embodiments.

FIG. 28 depicts results for a high spatial frequency slanted stripe target for use in a camera for use in a portable multifunction device in accordance with some embodiments. A target of red and blue slanted stripes 2810 is shown. A notional 5MP sampling of the target 2820 is shown. RGBunfil 2840 is shown. Gray 2850 is shown. RGBfil 2860 is shown. FIG. 28 illustrates the results of imaging an alternative target. In this case the target is no longer black and white, but is instead red and blue (there is no green information).

Although the individual channel estimates are not shown, it can be seen that the RGBunfil matrix produces a much better reconstruction of the target than the notional ideal 5MP sampling and the filtered RGBfil matrix. The main reason for this is that in reality there is not grayscale information in the target: all pixels should have the same channel average. As can be seen in the GRAY matrix, there are aliasing sampling artifacts meaning that there are false stripes. In addition the RGBfil matrix has lost virtually all the chromatic information and we are left with magenta.

Hence FIGS. 27 and 28 show two extreme cases: one where there is no color information in the target, but only grayscale information; and one where there is no grayscale information, but only color information. The final parts of FIG. 8 illustrate that to combat this issue, there is a final stage to the super-resolution algorithm that essentially on a per-sub-pixel basis determines the contribution to the final image from RGBunfil and RGBfil. This is achieved by applying further kernels to differential color matrix DELTA described in FIG. 23, as compared to GRAY to assess the amount of differential color information local to each pixel. If there is considerable color information, RGBunfil is favored. If there is little color information, RGBfil is favored.

Figure 29:
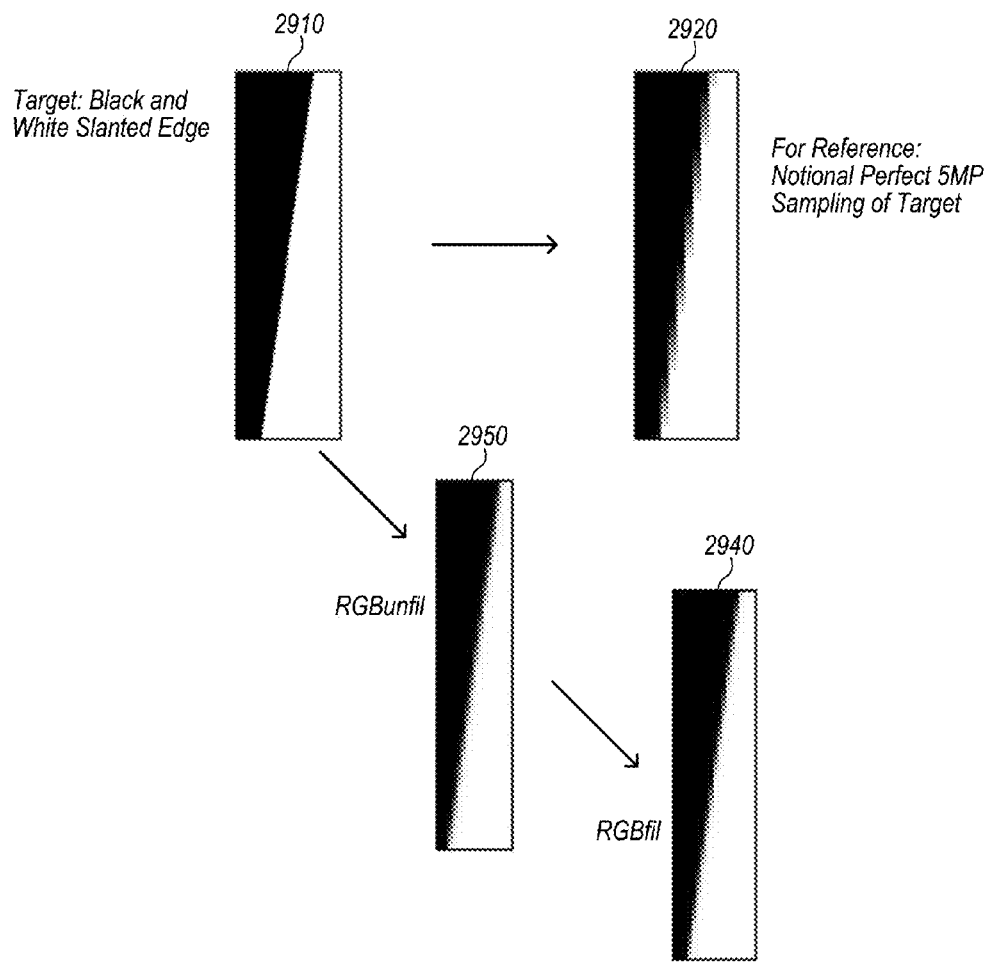
FIG. 29 illustrates results for a black and white slanted edge target for use in a camera for use in a portable multifunction device in accordance with some embodiments.
Figure 30:
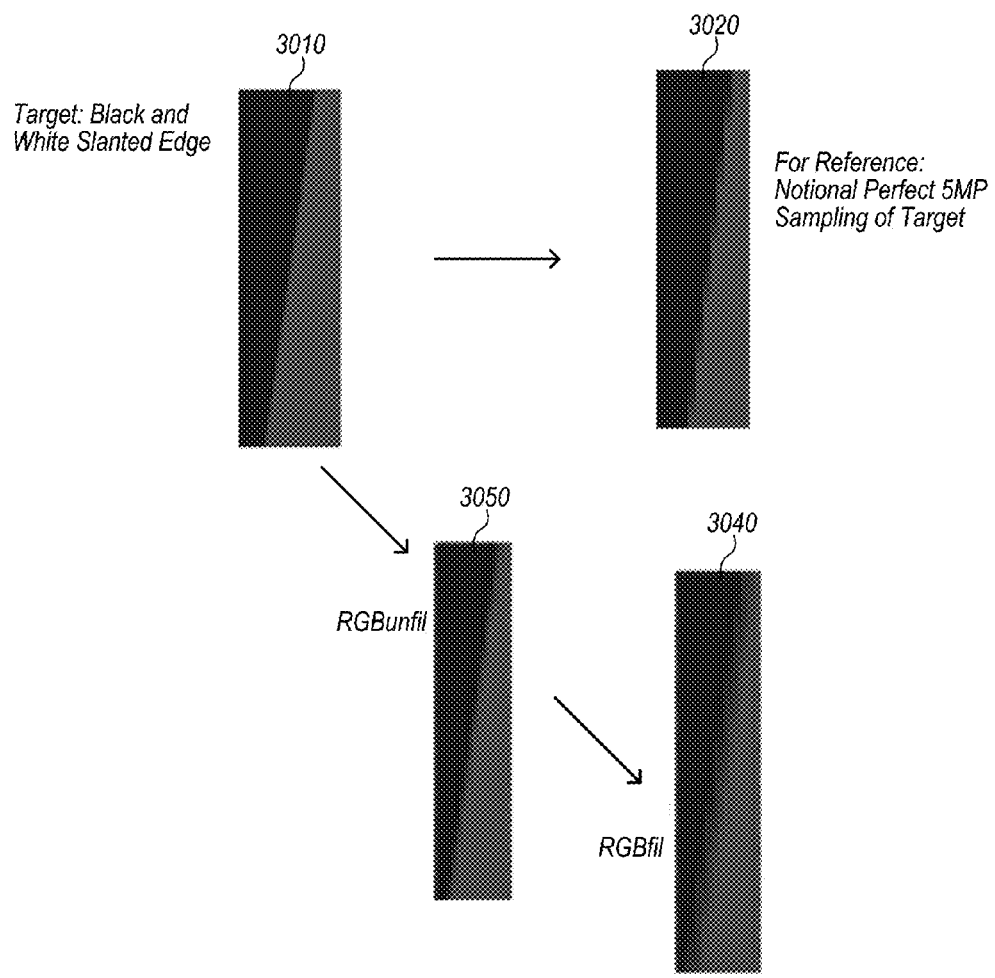
FIG. 30 depicts results for a red and blue slanted edge target for use in a camera for use in a portable multifunction device in accordance with some embodiments.

FIGS. 29 and 30 illustrate this same problem for slanted edge targets, rather than striped targets. For these slanted edge cases, RGBfil works best for black and white targets, whereas RGBunfil works best for colored targets.

FIG. 29 illustrates results for a black and white slanted edge target for use in a camera for use in a portable multifunction device in accordance with some embodiments. A target with a black and white slanted edge 2910 is shown. For reference a notional perfect 5MP sampling of the target 2920 is shown. RGBunfil 2950 is shown. RGBfil 2940 is shown.

FIG. 30 depicts results for a red and blue slanted edge target for use in a camera for use in a portable multifunction device in accordance with some embodiments. A target with a black and white slanted edge 3010 is shown. For reference a notional perfect 5MP sampling of the target 3020 is shown. RGBunfil 3050 is shown. RGBfil 3040 is shown.

Example Computer System

Figure 31:
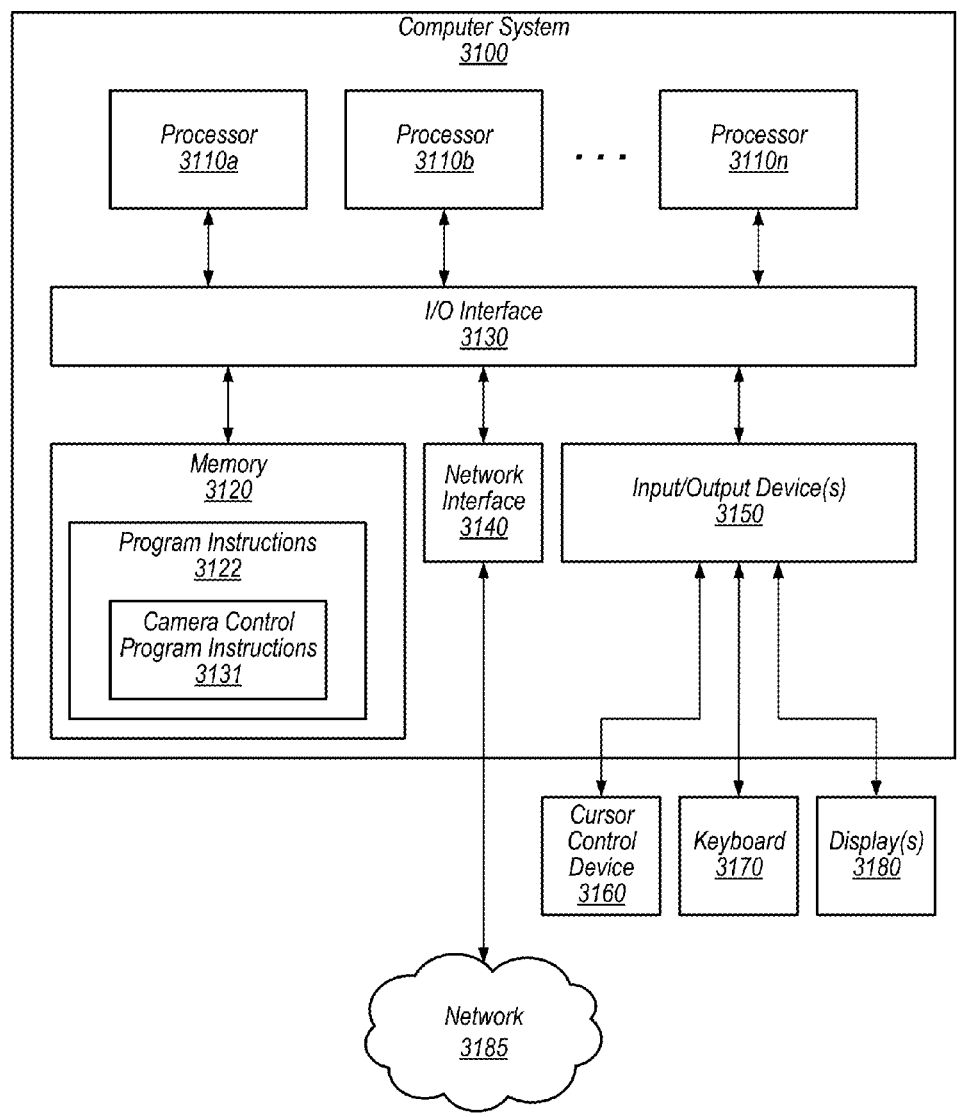
FIG. 31 illustrates an example computer system configured to implement aspects of the system and method for image capture.

FIG. 31 illustrates computer system 3100 that is configured to execute any or all of the embodiments described above. In different embodiments, computer system 3100 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for negotiating control of a shared audio or visual resource, as described herein, may be executed on one or more computer systems 3100, which may interact with various other devices. Note that any component, action, or functionality described above with respect to FIGS. 1-5 may be implemented on one or more computers configured as computer system 3100 of FIG. 31, according to various embodiments. In the illustrated embodiment, computer system 3100 includes one or more processors 3110 coupled to a system memory 3120 via an input/output (I/O) interface 3130. Computer system 3100 further includes a network interface 3140 coupled to I/O interface 3130, and one or more input/output devices 3150, such as cursor control device 3160, keyboard 3170, and display(s) 3180. In some cases, it is contemplated that embodiments may be implemented using a single instance of computer system 3100, while in other embodiments multiple such systems, or multiple nodes making up computer system 3100, may be configured to host different portions or instances of embodiments. For example, in one embodiment some elements may be implemented via one or more nodes of computer system 3100 that are distinct from those nodes implementing other elements.

In various embodiments, computer system 3100 may be a uniprocessor system including one processor 3110, or a multiprocessor system including several processors 3110 (e.g., two, four, eight, or another suitable number). Processors 3110 may be any suitable processor capable of executing instructions. For example, in various embodiments processors 3110 may be general-purpose or embedded processors implementing any of a variety of instruction set architectures (ISAs), such as the x86, PowerPC, SPARC, or MIPS ISAs, or any other suitable ISA. In multiprocessor systems, each of processors 3110 may commonly, but not necessarily, implement the same ISA.

System memory 3120 may be configured to store program instructions 3122 and/or existing state information and ownership transition condition data 3131 accessible by processor 3110. In various embodiments, system memory 3120 may be implemented using any suitable memory technology, such as static random access memory (SRAM), synchronous dynamic RAM (SDRAM), nonvolatile/Flash-type memory, or any other type of memory. In the illustrated embodiment, program instructions 3122 may be configured to implement a mapping application 3124 incorporating any of the functionality described above. Additionally, existing state information and ownership transition condition data 3131 of memory 3120 may include any of the information or data structures described above. In some embodiments, program instructions and/or data may be received, sent or stored upon different types of computer-accessible media or on similar media separate from system memory 3120 or computer system 3100. While computer system 3100 is described as implementing the functionality of functional blocks of previous Figures, any of the functionality described herein may be implemented via such a computer system.

In one embodiment, I/O interface 3130 may be configured to coordinate I/O traffic between processor 3110, system memory 3120, and any peripheral devices in the device, including network interface 3140 or other peripheral interfaces, such as input/output devices 3150. In some embodiments, I/O interface 3130 may perform any necessary protocol, timing or other data transformations to convert data signals from one component (e.g., system memory 3120) into a format suitable for use by another component (e.g., processor 3110). In some embodiments, I/O interface 3130 may include support for devices attached through various types of peripheral buses, such as a variant of the Peripheral Component Interconnect (PCI) bus standard or the Universal Serial Bus (USB) standard, for example. In some embodiments, the function of I/O interface 3130 may be split into two or more separate components, such as a north bridge and a south bridge, for example. Also, in some embodiments some or all of the functionality of I/O interface 3130, such as an interface to system memory 3120, may be incorporated directly into processor 3110.

Network interface 3140 may be configured to allow data to be exchanged between computer system 3100 and other devices attached to a network 3185 (e.g., carrier or agent devices) or between nodes of computer system 3100. Network 3185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3150 may, in some embodiments, include one or more display terminals, keyboards, keypads, touchpads, scanning devices, voice or optical recognition devices, or any other devices suitable for entering or accessing data by one or more computer systems 3100. Multiple input/output devices 3150 may be present in computer system 3100 or may be distributed on various nodes of computer system 3100. In some embodiments, similar input/output devices may be separate from computer system 3100 and may interact with one or more nodes of computer system 3100 through a wired or wireless connection, such as over network interface 3140.

As shown in FIG. 31, memory 3120 may include program instructions 3122, which may be processor-executable to implement any element or action described above. In one embodiment, the program instructions may implement the methods described above, such as the methods illustrated by FIG. 8. In other embodiments, different elements and data may be included. Note that data 3131 may include any data or information described above.

Those skilled in the art will appreciate that computer system 3100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 3100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3100 may be transmitted to computer system 3100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A camera of a multifunction device, comprising:
 a first image sensor attached to a first substrate;
 a second image sensor attached to a second substrate;
 a lens system;
 a color-splitting component along an optical path between the lens system and the image sensors, wherein
  the color-splitting component separates the light into a plurality of respective portions of visible incoming light arriving at a camera module;
 a processor;
 a memory containing program instructions, wherein the instructions are computer-executable to cause the processor to perform:
  receiving at a plurality of digital image sensor arrays a plurality of respective portions of visible incoming light arriving at a camera module, wherein
   each respective portion of the plurality of respective portions comprises light of a wavelength range different from a wavelength range of another respective portion; and
  calculating positions of a plurality of corresponding apparent features in each of the respective portions of visible light;
  identifying misalignments of the plurality of digital image sensor arrays based at least in part on comparison of respective positions of ones of the corresponding apparent features in each of the respective portions of visible light;
  calculating respective contributions of the respective portions to the combined image data structure based at least in part on the misalignments;
  generating a combined image data structure from the plurality of respective portions, based at least in part on the respective contributions of the respective portions to the combined image data structure.

2. The camera of claim 1, further comprising program instructions computer-executable to cause the processor to perform:
 filtering the combined image data structure to extract grayscale information and differential color information at each pixel of a plurality of pixels of the combined image data structure.

3. The camera of claim 1, further comprising program instructions computer-executable to cause the processor to perform:
 calculating a channel average representing a spread in color information in the neighborhood of a given pixel of the combined image data structure, as compared to grayscale information in the neighborhood of the given pixel of the combined image data structure; and
 generating a final image comprising
  a proportion of the final image based on the image without filtering to chromatic information, and
  a proportion of the final image based on results of an averaging filter applied to the chromatic information.

4. The camera of claim 1, wherein the program instructions computer-executable to cause the processor to perform generating the combined image data structure from the plurality of respective portions, based at least in part on the respective contributions of the respective portions to the combined image data structure further comprise:
 program instructions computer-executable to cause the processor to perform generating the combined image data structure at a spatial resolution higher than a resolution of one or more of the plurality of digital image sensor arrays.

5. The camera of claim 1, wherein the program instructions computer-executable to cause the processor to perform identifying misalignments of the plurality of digital image sensor arrays based on comparison of respective positions of ones of the corresponding apparent features in each of the respective portions of visible light further comprise:
 program instructions computer-executable to cause the processor to perform separately sampling data from the one or more of the plurality of digital image sensor arrays, and
 program instructions computer-executable to cause the processor to perform assessing the data for one or more of the position of one or more supposed edges.

6. The camera of claim 1, wherein the program instructions computer-executable to cause the processor to perform identifying misalignments of the plurality of digital image sensor arrays based on comparison of respective positions of ones of the corresponding apparent features in each of the respective portions of visible light further comprise:
 program instructions computer-executable to cause the processor to perform separately sampling data from the one or more of the plurality of digital image sensor arrays, and
 program instructions computer-executable to cause the processor to perform assessing the data for one or more of the height of one or more supposed stripes.

7. The camera of claim 1, further comprising:
 program instructions computer-executable to cause the processor to perform filtering the combined image data structure to extract grayscale information and differential color information at each pixel of a plurality of pixels of the combined image data structure using an averaging filter to reduce color artifacts.

8. A method for resampling image data from a plurality of image sensor arrays in a miniature camera, the method comprising:
 receiving at a plurality of digital image sensor arrays a plurality of respective portions of visible incoming light arriving at a camera module, wherein
  each respective portion of the plurality of respective portions comprises light of a wavelength range different from a wavelength range of another respective portion; and
 calculating positions of a plurality of corresponding apparent features in each of the respective portions of visible light;
 identifying misalignments of the plurality of digital image sensor arrays based at least in part on comparison of respective positions of ones of the corresponding apparent features in each of the respective portions of visible light;
 calculating respective contributions of the respective portions to the combined image data structure based at least in part on the misalignments;
 generating a combined image data structure from the plurality of respective portions, based at least in part on the respective contributions of the respective portions to the combined image data structure.

9. The method of claim 8, further comprising:
filtering the combined image data structure to extract grayscale information and differential color information at each pixel of a plurality of pixels of the combined image data structure.

10. The method of claim 8, further comprising:
calculating a channel average representing a spread in color information in the neighborhood of a given pixel of the combined image data structure, as compared to grayscale information in the neighborhood of the given pixel of the combined image data structure; and
generating a final image comprising
   a proportion of the final image based on the image without filtering to chromatic information, and
   a proportion of the final image based on results of an averaging filter applied to the chromatic information.

11. The method of claim 8, wherein the generating the combined image data structure from the plurality of respective portions, based at least in part on the respective contributions of the respective portions to the combined image data structure further comprises:
generating the combined image data structure at a spatial resolution higher than a resolution of one or more of the plurality of digital image sensor arrays.

12. The method of claim 8, wherein the identifying misalignments of the plurality of digital image sensor arrays based on comparison of respective positions of ones of the corresponding apparent features in each of the respective portions of visible light further comprises:
separately sampling data from the one or more of the plurality of digital image sensor arrays, and
assessing the data for one or more of the position of one or more supposed edges.

13. The method of claim 8, wherein the identifying misalignments of the plurality of digital image sensor arrays based on comparison of respective positions of ones of the corresponding apparent features in each of the respective portions of visible light further comprises:
separately sampling data from the one or more of the plurality of digital image sensor arrays, and
assessing the data for one or more of the height of one or more supposed stripes.

14. The method of claim 8, further comprising:
filtering the combined image data structure to extract grayscale information and differential color information at each pixel of a plurality of pixels of the combined image data structure using an averaging filter to reduce color artifacts.

15. A non-transitory computer-readable storage medium storing program instructions, wherein the program instructions are computer-executable to implement:
receiving at a plurality of digital image sensor arrays a plurality of respective portions of visible incoming light arriving at a camera module, wherein
   each respective portion of the plurality of respective portions comprises light of a wavelength range different from a wavelength range of another respective portion; and
calculating positions of a plurality of corresponding apparent features in each of the respective portions of visible light;
identifying misalignments of the plurality of digital image sensor arrays based at least in part on comparison of respective positions of ones of the corresponding apparent features in each of the respective portions of visible light;
calculating respective contributions of the respective portions to the combined image data structure based at least in part on the misalignments;
generating a combined image data structure from the plurality of respective portions, based at least in part on the respective contributions of the respective portions to the combined image data structure.

16. The non-transitory computer-readable storage medium of claim 15, further comprising:
program instructions computer-executable to implement filtering the combined image data structure to extract grayscale information and differential color information at each pixel of a plurality of pixels of the combined image data structure.

17. The non-transitory computer-readable storage medium of claim 15, further comprising:
program instructions computer-executable to implement calculating a channel average representing a spread in color information in the neighborhood of a given pixel of the combined image data structure, as compared to grayscale information in the neighborhood of the given pixel of the combined image data structure; and
program instructions computer-executable to implement generating a final image comprising
   a proportion of the final image based on the image without filtering to chromatic information, and
   a proportion of the final image based on results of an averaging filter applied to the chromatic information.

18. The non-transitory computer-readable storage medium of claim 15, wherein the program instructions computer-executable to implement generating the combined image data structure from the plurality of respective portions, based at least in part on the respective contributions of the respective portions to the combined image data structure further comprise:
program instructions computer-executable to implement generating the combined image data structure at a spatial resolution higher than a resolution of one or more of the plurality of digital image sensor arrays.

19. The non-transitory computer-readable storage medium of claim 15, wherein the program instructions computer-executable to implement identifying misalignments of the plurality of digital image sensor arrays based on comparison of respective positions of ones of the corresponding apparent features in each of the respective portions of visible light further comprise:
program instructions computer-executable to implement separately sampling data from the one or more of the plurality of digital image sensor arrays, and
program instructions computer-executable to implement assessing the data for one or more of the position of one or more supposed edges.

20. The non-transitory computer-readable storage medium of claim 15, wherein the program instructions computer-executable to implement identifying misalignments of the plurality of digital image sensor arrays based on comparison of respective positions of ones of the corresponding apparent features in each of the respective portions of visible light further comprise:
program instructions computer-executable to implement separately sampling data from the one or more of the plurality of digital image sensor arrays, and
program instructions computer-executable to implement assessing the data for one or more of the height of one or more supposed stripes.

* * * * *